US006409602B1

(12) United States Patent
Wiltshire et al.

(10) Patent No.: US 6,409,602 B1

(45) Date of Patent: Jun. 25, 2002

(54) SLIM TERMINAL GAMING SYSTEM

(75) Inventors: Michael S. Wiltshire; James J. Lisenbee, both of Reno, NV (US); Jayant S. Karmarkar, Aptos, CA (US); Timothy A. Wiltshire, Reno, NV (US)

(73) Assignee: New Millenium Gaming Limited, Reno, NV (US)

( * ) Notice: Subject to any disclaimer, the term of this patent is extended or adjusted under 35 U.S.C. 154(b) by 0 days.

(21) Appl. No.: 09/199,529

(22) Filed: Nov. 24, 1998

Related U.S. Application Data

(63) Continuation-in-part of application No. 09/187,135, filed on Nov. 6, 1998, now abandoned.

(51) Int. Cl.[7] ................................................ A63F 13/00

(52) U.S. Cl. ........................................... 463/42; 463/16

(58) Field of Search .............................. 463/42, 12, 13, 463/16, 18, 19, 24, 26, 27, 29, 36, 37, 38, 39, 40, 41, 43; 707/1, 2, 3, 101, 102, 104, 501, 513; 700/91, 92, 93; 273/148 B

(56) References Cited

U.S. PATENT DOCUMENTS

| | | | |
|---|---|---|---|
| 4,572,509 A | 2/1986 | Sitrick | 273/85 |
| 4,856,787 A | 8/1989 | Itkis | 273/237 |
| 4,866,515 A | 9/1989 | Tagawa et al. | 358/86 |

(List continued on next page.)

FOREIGN PATENT DOCUMENTS

| | | | |
|---|---|---|---|
| WO | WO 97/43846 | 11/1997 | H04L/29/06 |

OTHER PUBLICATIONS

Bolot, et al., "Adding Voice To Distributed Games On The Internet", IEEE Infocom '98, vol. 2, pp. 480–487 (Mar. 29–Apr. 1998).

Bricker, et al., "Experience With DREGS", Proceedings of the Summer 1987 UNSENIX Conference, pp. 471–481 (Jun. 8–12, 1987).

Vanderheiden, "Anywhere anytime (+ anyone) access to the next–generation WWW", Computer Networks and ISDN Systems 29, pp. 1439–1446 (1997).

(List continued on next page.)

*Primary Examiner*—Jessica J. Harrison

(74) *Attorney, Agent, or Firm*—Skjerven Morrill MacPherson LLP; Fabio E. Marino

(57) ABSTRACT

A computer gaming system and method of operation thereof are provided that both drastically reduce the cost of gaming stations and allow contemporaneous access to multiple game programs from a single gaming station. The computer gaming system of the present invention allows for transparent modifications and upgrades to the gaming programs by executing gaming programs on a server/host computer connected to a plurality of client/terminal computers via communication pathways. Each client/terminal computer comprises a client/terminal program that allows input and output streams of the gaming program executed on the server/host computer to be separated and redirected to the client/terminal computers. Since the gaming programs are executed entirely on the server/host computer, with only wagering input and display output operations being executed on the client/terminal computers, the cost of the hardware and software required for each client/terminal computer is greatly reduced. A patron of a client/terminal computer can access any of the gaming programs executed on the server/host computer. Modifications and upgrades of the gaming programs only need to be performed on the server/host computer. By using a stereo head-mounted display together with a joystick input device and wireless communication pathways, the present invention allows a patron to participate in a mobile gaming environment.

29 Claims, 18 Drawing Sheets

U.S. PATENT DOCUMENTS

| | | | | | |
|---|---|---|---|---|---|
| 5,179,517 | A | | 1/1993 | Sarbin et al. | 364/410 |
| 5,305,195 | A | | 4/1994 | Murphy | 364/401 |
| 5,404,567 | A | | 4/1995 | DePietro et al. | 455/63 |
| 5,429,361 | A | | 7/1995 | Raven et al. | 273/138 |
| 5,430,791 | A | | 7/1995 | Feit et al. | 379/67 |
| 5,465,082 | A | | 11/1995 | Chaco | 340/825.54 |
| 5,476,259 | A | | 12/1995 | Weingardt | 273/85 |
| 5,530,232 | A | | 6/1996 | Taylor | 235/380 |
| 5,530,469 | A | | 6/1996 | Garfinkle | 348/1 |
| 5,553,864 | A | | 9/1996 | Sitrick | 463/31 |
| 5,559,313 | A | | 9/1996 | Claus et al. | 235/380 |
| 5,578,808 | A | | 11/1996 | Taylor | 235/380 |
| 5,586,257 | A | | 12/1996 | Perlman | 463/42 |
| 5,586,937 | A | | 12/1996 | Menashe | 463/41 |
| 5,617,331 | A | | 4/1997 | Wakai et al. | 364/514 |
| 5,630,757 | A | | 5/1997 | Gagin et al. | 463/43 |
| 5,640,192 | A | | 6/1997 | Garfinkle | 348/1 |
| 5,649,118 | A | | 7/1997 | Carlisle et al. | 395/241 |
| 5,655,961 | A | * | 8/1997 | Acres et al. | 463/27 X |
| 6,003,123 | A | | 8/1997 | Carter et al. | 711/207 X |
| 5,755,621 | A | * | 5/1998 | Marks et al. | 463/42 X |
| 5,800,268 | A | | 9/1998 | Molnick | 463/40 |
| 5,833,540 | A | | 11/1998 | Miodunski et al. | 463/42 |
| 5,845,283 | A | * | 12/1998 | Williams et al. | 707/101 X |
| 5,851,149 | A | | 12/1998 | Xidos et al. | 463/42 |
| 6,003,094 | A | | 2/1999 | Dean | 709/303 X |
| 5,903,732 | A | * | 5/1999 | Reed et al. | 395/200.59 X |
| 5,905,248 | A | * | 5/1999 | Russell et al. | 235/462 X |
| 5,913,164 | A | * | 6/1999 | Pawa et al. | 455/427 X |
| 5,918,039 | A | * | 6/1999 | Buswell et al. | 395/527 |
| 5,951,653 | A | * | 9/1999 | Hill et al. | 709/304 X |
| 5,958,028 | A | * | 9/1999 | Bean et al. | 710/62 X |
| 5,971,271 | A | * | 10/1999 | Wynn et al. | 235/380 X |
| 5,971,849 | A | * | 10/1999 | Falciglia | 463/16 |
| 5,974,409 | A | * | 10/1999 | Sanu et al. | 707/3 X |
| 5,980,093 | A | * | 11/1999 | Jones et al. | 364/489 X |
| 5,983,190 | A | * | 11/1999 | Trower, II et al. | 704/276 X |
| 5,991,760 | A | * | 11/1999 | Gauvin et al. | 707/10 X |
| 5,991,790 | A | | 11/1999 | Shah et al. | 709/100 X |
| 5,996,068 | A | | 11/1999 | Dwyer, III et al. | 712/228 X |
| 6,003,066 | A | | 12/1999 | Ryan et al. | 709/201 X |
| 6,085,247 | A | * | 7/2000 | Parsons, Jr. et al. | 709/227 |
| 6,141,737 | A | * | 10/2000 | Krantz et al. | 711/171 |

OTHER PUBLICATIONS

Richardson, et al., "Virtual Network Computing, IEEE Internet Computing", 6 pp. (Jan.–Feb. 1998).

Zukowski, et al. "Metis: A Thin–client Application Framework", Conference On Object–Oriented Technologies and Systems, pp. 103–114 (Jun. 16–20, 1997).

Nance, "Wireless Wonder", Review from Byte, p. 115 (Sep. 1997).

Lavitt, "Entertainment Firm Bets On In–Flight Video Gambling", Aviation Week & Space Technology, International Product News, p. 56 (Feb. 19, 1996).

Hendry, Smart Card Security and Applications, Artech House, Inc., pp. 195–206 (1997).

Busey, "Secrets of the MUD Wizard", First Edition, Sams.net Publishing, entire book (1995).

Maloni, et al., "netgames™ Your Guide to the Games People Play on the Electronic Highway", Random House Electronic Publishing, entre book (1994).

* cited by examiner

600

930

SLIM TERMINAL GAMING SYSTEM

CROSS-REFERENCE TO RELATED APPLICATION

This application is a continuation-in-part of U.S. patent application Ser. No. 09/187,135, filed Nov. 6, 1998 now abandoned.

BACKGROUND OF THE INVENTION

1. Field of the Invention

The present invention relates generally to computers and, more particularly, to computer-implemented gaming systems.

2. Related Art

Computer gaming systems are typically comprised of computer stations including a display device, a wager or bet-acceptor, and controls such as buttons, keyboards, levers or the like. Typically, computer gaming stations are dedicated to only one type of game (e.g., video poker, black jack, slot machine) and their physical appearance, as well as the location of the controls, are customized for the game provided. Gaming stations may be modified to provide a different type of game, but this typically requires hardware modifications to be performed (e.g., changing an electronic card on which the game program is stored).

The terms "game" and "gaming," as used herein, include all types of electronic, electromechanical or mechanical gambling and casino game facsimiles (as defined in 15 U.S.C. 11719(a) (2) or (3), such as faro, monte, roulette, keno, bingo, fan-tan, twenty-one, blackjack, seven-and-a-half, big injun, klondike, craps, poker, chuck-a-luck, Chinese chuck-a-luck (dai shu), wheel of fortune, chemin de fir, baccarat, pai gow, beat the banker, panguingui, slot machines, video poker machines, etc.; lottery, sports betting and pari-mutuel wagering as well as games of skill and or strategy such as chess, checkers, backgammon, "board" games such as Monopoly and Scrabble, card games such as Pinochle, Hearts, Spades; video based games such as Doom, Pong, Packman, Myst; video games based on sports such as golf, baseball, football, basketball, soccer, rugby; arcade type games; non-house stake games between two or more players; games defined by IGRA (Indian Gaming Regulatory Act) as class II games.

Physical embodiments of various games from the past have been reimplemented into microcomputer-based video gaming stations during the last 20 years. This reimplementation has been motivated by reliability, manufacturability, and ultimately, total cost of maintaining the computer (video) gaming station during its useful life.

In addition, computer systems have been devised where a cluster of gaming stations are controlled by a central computer. The central computer can "download" and thereby change the game program executed by a gaming station or even allow players at different gaming stations to play against one another, with the house (or casino) levying a periodic fee for the privilege of using the gaming station.

Finally, casino gaming websites allow casino games to be played on a website connected to the Internet. In such systems, a user connects to the website via the Internet using a web browser. A web page (HTML code) is then downloaded from a server/host computer associated with the website to the user's computer. Typically, the web page comprises formatted text, graphics and links to other web pages. In addition, the web page may contain one or more applets. When a web page containing an applet is downloaded onto the user computer, JAVA™ bytecodes associated with the applet are also downloaded to and executed on the user's computer. Web pages can also contain Java Script™ and/or Visual Basic (VB) script and use Common Gateway Interface (CGI) based scripting to provide dynamic web pages.

However, in all of these non-website-based systems the gaming program is executed in whole or in part on the individual gaming station. As a result, each gaming station becomes expensive to manufacture. Because the physical structure of the gaming stations is designed to accommodate a particular game, multiple game stations require additional hardware and, therefore, further increase the cost of a cluster of these stations.

In addition, since the games are executed on individual gaming stations, modifications and upgrades to the gaming programs require access to the individual gaming stations, which renders the gaming stations inaccessible to the patron during the modification and/or upgrade process.

SUMMARY OF THE INVENTION

The present invention provides a computer gaming system and method of operation thereof that both drastically reduces the cost and substantially increases the tamper resistance of individual gaming stations. The computer gaming system of the present invention allows concurrent access to multiple computer gaming programs from individual gaming stations by a patron. Moreover, the computer gaming system of the present invention allows for transparent modifications and upgrades to the computer gaming programs and the associated pay tables. Furthermore, the computer gaming system of the present invention enables concurrent, non-intrusive status monitoring of clustered gaming stations for engineering maintenance and regulatory purposes. This functionality is implemented by executing various gaming and related game management programs exclusively on a server/host computer connected to a plurality of remote client/terminal computers via communication pathways. Each client/terminal computer comprises a client/terminal program that allows the computer gaming program executed on the server/host computer to accept input from the patrons, and control the gaming content of an output information stream directed to the client/terminal computers.

Since the gaming programs and the associated gaming display generation programs are executed entirely on the server/host computer, with only input wagering and output screen display related operations being executed on the client/terminal computers, the cost of the hardware and software required for each client/terminal computer is greatly reduced. Moreover, the "fairness or regulatory compliance" of the various computer gaming programs being executed on the server/host computer can be continually monitored by the duly authorized regulators in whose jurisdiction the server/host computer and client/terminal computers reside. Furthermore, the periodic maintenance leading to reliability and availability improvements can also be performed largely on the server/host computer. Additionally, a patron using any one of the cluster of client/terminal computers can access any of the computer gaming programs being concurrently executed on the server/host computer. Modifications and upgrades of the computer gaming programs only need to be performed on the server/host computer, thereby minimizing the unavailability of the gaming stations.

Finally, by using a touch screen display device, the computer gaming system of the present invention allows customization of game controls for each computer gaming program without requiring additional hardware controls to be provided on each gaming station.

DETAILED DESCRIPTION OF THE EMBODIMENTS

Figure 1A:
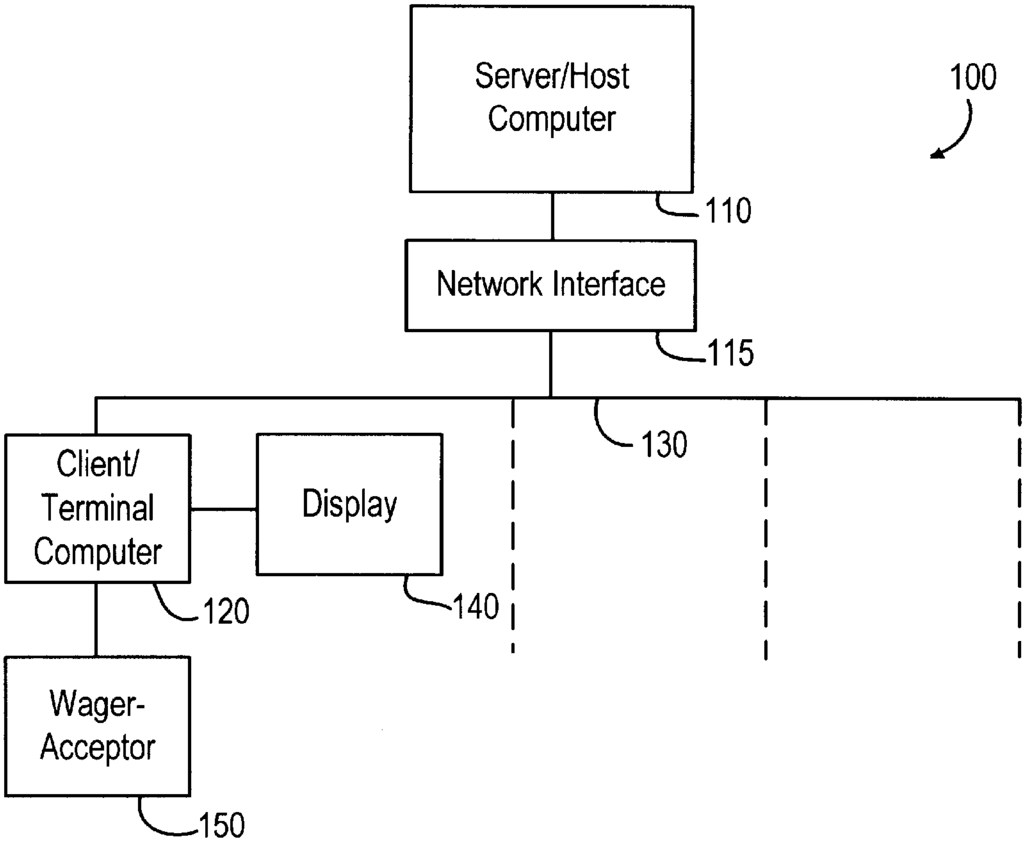
FIG. 1A is a block diagram of a computer gaming system, in accordance to an embodiment of the invention.

A computer gaming system 100, in accordance to one embodiment of the invention, is shown in FIG. 1A. Computer gaming system 100 includes a server/host computer 110 connected to a plurality of remote client/terminal computers 120 via network interface 115 and communication pathways 130. Each of client/terminal computers 120 is connected to a display device 140. Communication pathways 130 are implemented with electrical cables, optical fibers, RF links, IR links and protocol interfaces such as LAN, WAN, or any combination thereof.

In some embodiments, display devices 140 are touch screen display devices- that allow a patron to enter input commands by simply touching the screen of display device 140. The use of touch screen display devices eliminates the need for separate input controls to be provided on client/terminal computers 120 such as a keyboard. As a result, the hardware cost for each client/terminal computer 120 is reduced. Moreover, since the context and meaning of input controls on a touch screen display device can be dynamically modified without requiring hardware modifications, input controls can be customized for different gaming programs executed on computer gaming system 100. However, those skilled in the art realize that display devices other than touch screen display devices can be used in accordance to the principles of the invention. For example, conventional CRT, LCD displays or (stereo) head mounted displays with separate input controls such as a six degrees of freedom joystick/mouse can be used in place of touch screen display devices. Moreover, in some embodiments, display devices 140 may also include a mechanical reel system, in lieu of or in combination with a monitor, to display game results using "virtual reel" technology as described, for example, in U.S. Pat. No. 4,448,419 to Telnaes, entitled "Electronic Gaming Device Utilizing a Random Number Generator for Selecting the Reel Stop Positions." Accordingly, the invention is not limited to any particular type of display or input device.

Furthermore, in some embodiments of the invention, each client/terminal computer 120 includes a wagering or bet-acceptor device 150 such as a coin collector, a bill collector, a smart-card reader, a credit-card reader, etc.

Figure 1B:
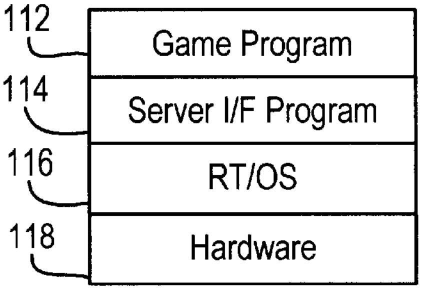
FIG. 1B is a block diagram of the software/hardware structure of the server/host computer of FIG. 1A.

FIG. 1B is a block diagram illustrating the hardware/software control structure of server/host computer 110. One or more game programs 112 executed on server/host computer 110 runs on top of the server/host interface program 114, also executed on server/host computer 110. Server/host interface program 114, in turn, is executed on top of a computer operating system 116. Finally, the computer operating system 116 controls the hardware layer 118 of server/host computer 110.

Figure 1C:
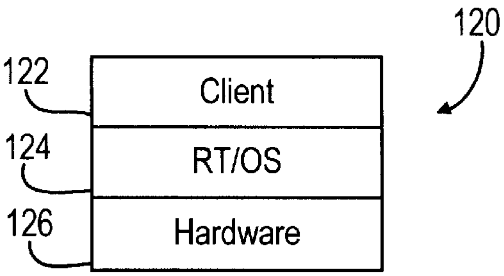
FIG. 1C is a block diagram of the software/hardware structure of a client/terminal computer of FIG. 1A.
Figure 1D:
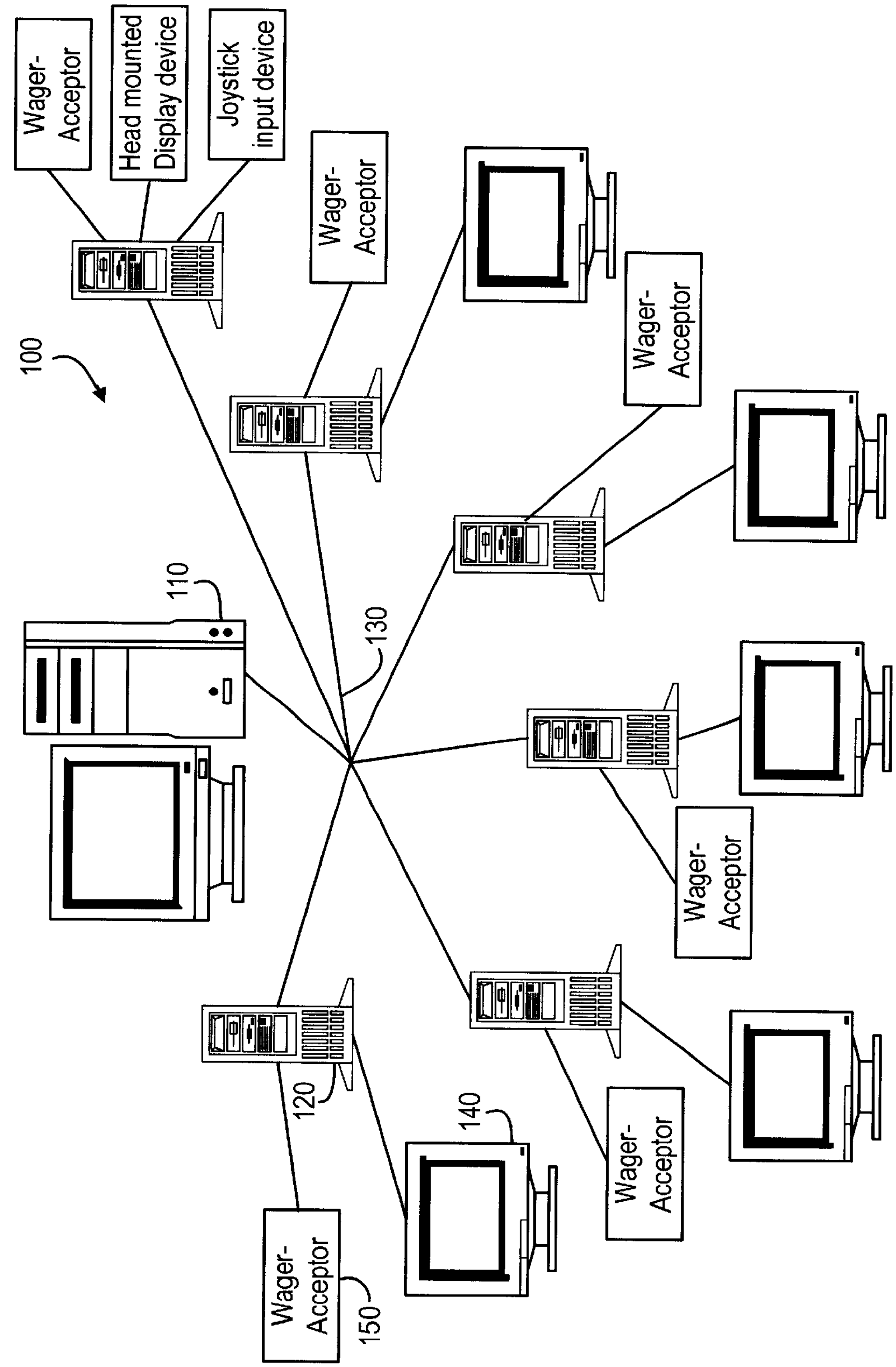
FIG. 1D is a diagram of an embodiment of the computer gaming system of FIG. 1A.

FIG. 1C is a block diagram illustrating the hardware/software control structure of client/terminal computer 120. A non-gaming-related client/terminal program 122 executed on the client/terminal computer 120 runs on top of the operating system 124, which in turn runs on top of the actual hardware 126 of client/terminal computer 120.

The server/host computer 110 can be any type of general purpose computer such as an Intel® x86 or Pentium® based computer, or a Mac® PowerPC computer, or a Sun® SPARC™ computer, etc. To ensure optimal performance of the entire computer gaming system 100, server/host computer 110 should have sufficient storage, memory and processing power, to support the plurality (e.g., at least eight) of client/terminal computers 120 to which it is connected via network interface 115 and communication pathways 130 in order to provide acceptable response time to random inputs from all the patrons. For instance, in some embodiments, the server/host computer 110 has the following hardware configuration: Pentium® II motherboard, 400 Mhz Pentium® II processors, 512 MB of 100 Mhz SDRAM, dual channel U2W SCSI controller, dual 2.0 GB U2W SSD mirrored drives, AGP video card, 1000 Base-T PCI NIC card, 1.44 inch. floppy disk drive and 32X IDE CD-ROM drive.

In some embodiments a separate accounting server/host computer, also connected to communication pathways 130, is used to keep track of the accounts of various patrons and other gaming management functions. The hardware configuration of the accounting server/host computer is as follows: Pentium® II motherboard, 400 Mhz Pentium® II processors, 512 MB of 100 Mhz SDRAM, 96 GB hardware-based RAID array, 96 GB tape backup, AGP video card, 1000 Base-T PCI NIC card, 1.44 inch floppy disk drive and 32X IDE CD-ROM drive. When the accounting server is used, the casino gaming system 100 may also perform some of the casino management tasks such as player tracking and compensation, player gaming license tracking, gaming station maintenance and regulatory management, linkage to local, wide and global area progressive jackpots, etc.

Client/terminal computers 120 can also be any type of cost effective special purpose or general purpose computer such as an Intel® x86 or Pentium® based computer, a Mac® PowerPC computer, a Sun® SPARC®, etc. However, unlike, the server/host computer 110, the client/terminal computers 120 only need to have minimal storage, memory and processing power to ensure optimum functional operation of the overall multi-computer system 100, since the overwhelming majority of the gaming related and regulated processing is performed on the server/host computer 110. As a result, the cost of the hardware required for each client/terminal computer 120 is greatly reduced with respect to prior art computer video gaming systems.

In some embodiments, the client/terminal computers 120 are WinTerm™ 3315SE terminals available from Wyse Technology, Inc. of San Jose, Calif.

The communication pathways 130 is any type of local area, wide area or global communication pathways, including the Internet and the World Wide Web. In some embodiments network interface 115 has the following hardware configuration: 8-port 1000 base-T Switch, two sets of fiber-optic 1000 base-T rated cables, two 12-port 100 base-T backbones switches with 1000 base-T uplink port, twenty-four 12-port 10 MB switches with 100 MB uplink port. Communication pathways 130 are any communication pathways suitable for connecting server/host computer 110 to client/terminal computers 120 via network interface 115. In some embodiments, communication pathways 130 has the following hardware configuration: CAT-5 twisted pair cabling.

Game program 112 is any type of gaming program that runs on an operating system 116 executed on server/host computer 110. The operation of specific examples of casino games supported by game program 112 are further discussed below with respect to FIGS. 4A, 4B, 5A, 5B, 6A, 6B, 7A, 7B, 8A, 8B, 9A, 9B, 9C and 9D. Server/host interface program 114 is any program that allows a program executed on a server/host computer to separate the input and output at the application layer of the protocol stack as defined by OSI and redirect the I/O over a communication pathways to be performed on client/terminal computers 120 via client/terminal program 122 executed on the client/terminal computers 120. What is meant by "the game program controlling input and output operations performed on the client/terminal computer" is that the game program determines which images are to be displayed on a screen of the client/terminal computer and that input commands such as mouse movements, mouse clicks or keystrokes or lever activation detected by the client/terminal computer are sent directly to the server/host based game program for context interpretive processing.

Moreover, in some embodiments, multiple display devices 140 are connected directly to display adapters of server/host computer 110. In these embodiments, operating system 116 allows multiple gaming threads of game program 112 to be executed at one time, with each instance of game program 112 driving a separate display device 140. A thread, as used herein, is intended as an atomic unit of processing supported by operating system program 116. Accordingly, a thread may be either a process or a sub-component of a process, depending on the implementation of operating system program 116. In a multithreading operating system, multiple threads can be executed at the same time by the operating system, with the operating system controlling the amount of processing time allocated to each thread. This process is sometimes referred to as preemptive multitasking. When a thread is a sub-component of a process, multiple threads within a process share the same memory address space.

In some embodiments, the server/host interface program 114 is WinFrame® or MetaFrame™, available from Citrix Systems, Inc. of Ft. Lauderdale Fla. Alternatively, the server/host interface program 114 may be Windows NT Server 4.0 Terminal Server Edition™, available from Microsoft Corp. of Redmond, Wash., or Tarantella™, available from The Santa Cruz Operation, Inc. of Santa Cruz, Calif., or Go-Global™, available from Graphon Corp. of Campbell Calif., or Liftoff® server available from New Moon Software, Inc., of Santa Clara, Calif. or Applica U2 or Applica Workgroup available from Concurrent Controls, Inc., of South San Francisco, Calif., or Netwinder WS, available from Corel Computer Corp. of Ottawa, Canada or any Citrix Independent Computing Architecture (ICA®) compatible server/host interface program.

The server/host operating system 116 is any operating system that can be executed on hardware 118 of server/host computer 110. In some embodiments, the server/host operating system 116 is Windows NT® 4.0, Windows95®, Windows98®, or the forthcoming Windows2000®, available from Microsoft, Corp. of Redmond, Wash. Alternatively, the operating system 118 can be Mac OS™ 8.5, available from Apple Computer, Inc. of Cupertino, Calif. or Solaris™ available from Sun MicroSystems of Mountain View, Calif., or Red Hat Linux 5.1, available from Red Hat Software of Research Triangle Park, N.C., or any other suitable operating system known in the art.

Client/terminal program 122 is any computer program residing on the client/terminal that allows game management program 112 to control input and output operations performed on client/terminal computers 120 via server/host interface program 114. In some embodiments, the client/terminal program 122 is a WinFrame® 1.7 DOS client. Alternatively, client/terminal program **112*n*** can be a MetaFrame™ client, any Citrix ICA® compatible client program, Go-Between™, available from Graphon Corp. of Campbell Calif., or Liftoff® Client available from New Moon Software, Inc. of Santa Clara, Calif.

Client operating system 124 is any operating system that can be executed on hardware 126 of client/terminal computer 120. In some embodiments, operating system 124 is MS-DOS®, Windows98™ or Windows NT® 4.0, or Windows CE® available from Microsoft, Corp. of Redmond, Wash. Alternatively, operating system 124 can be any Microsoft Remote Desktop Protocol (RDP™) compatible operating system, available from Microsoft, Corp. of Redmond, Wash., Mac OS™ 8.5, available from Apple Computer, Inc. of Cupertino, Calif. or pSOS+ available from Integrated Systems, Inc. of Santa Clara, Calif. or QNX available from QNX Software Systems Ltd. Of Kanata, Canada or VRTX Real-time Operating System, available from Mentor graphics of Wilsonville, Oreg., Applica U2 or Applica Workgroup, available from Concurrent Controls, Inc., of South San Francisco, Calif., or any version of the X11 terminal client from OSI developed by MIT, or any other cost effective and functionally suitable operating system known in the art.

Figure 2:
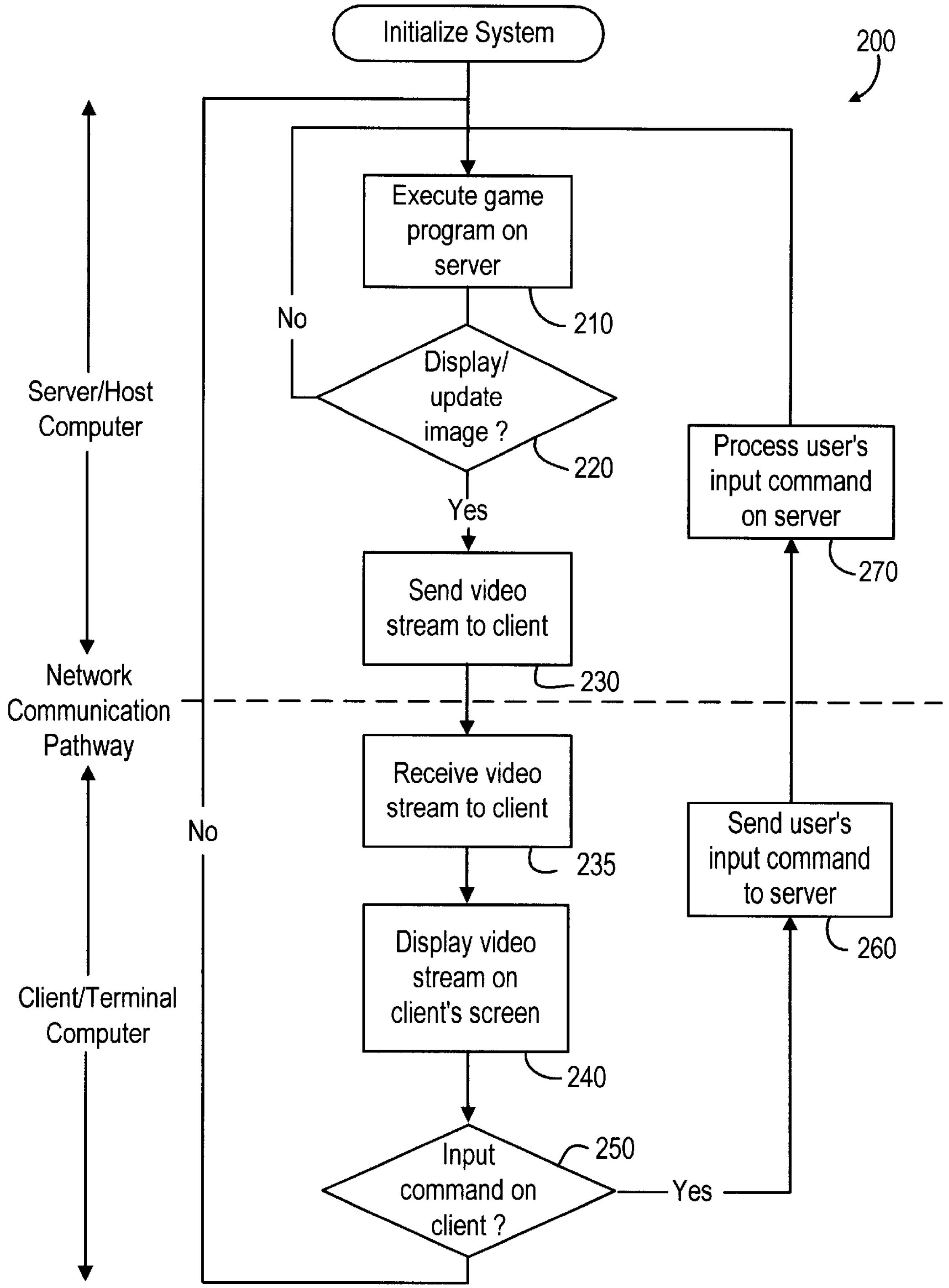
FIG. 2 is a flow diagram of the operation of computer gaming system of FIG. 1.

FIG. 2 is a flow diagram of operation 200 of computer gaming system 100 of FIG. 1A. Initially, game program 112 is executed on server/host computer 110 in stage 210. Stage 220 then determines whether an image is to be displayed on the screen of client/terminal computer 120, in which case operation 200 proceeds to stage 230. Otherwise, operation 200 proceeds to stage 250. In stage 230, an image is sent from server/host computer 110 to client/terminal computer 120. The image may include any type of graphical information including a bitmap, a JPEG file, a TIFF file or even an encoded audio/video stream such as a compressed video MPEG stream. The image is generated by game computer program 112 and passed to server/host interface program 114. In turn, the image is transferred over communication pathways 130 to client/terminal computer 120 via the network services provided by server operating system 116. The image is received by client/terminal program 122 executing on client/terminal computer 120 via the network services provided by client operating system 124. Client/terminal program 122 then causes the image to be displayed on a screen of client/terminal computer 120 in stage 240. Stage 250 then determines whether an input command has been entered by the patron using client/terminal computer 120, in which case operation 200 proceeds to stage 260. Otherwise, operation 200 reverts to stage 210. The input command may be a keystroke, movement or clicking of the mouse, a voice activated command or even the clicking of a "virtual button" on a touch screen. In stage 260, client/terminal program 122 causes the input command detected in stage 250 to be transmitted back to server/host computer 110 via communication pathways 130, again using network services provided by client operating system 124 on one end and server operating system 116 on the other. The command is thus received by server/host interface program 114, that, in turn, passes the command back to game program 112. In stage 270, game program 112 processes the input command and updates the state of the game accordingly. Once the command has been processed, operation 200 proceeds back to stage 210 for further execution of the game program 112.

Those skilled in the art will realize that the flow diagram of FIG. 2 is exemplary in nature, since the stages shown in FIG. 2 may in fact overlap in time if performed by concurrent processes executed on server/host computer 110 and client/terminal computers 120. Accordingly, the invention is not limited to any particular sequence of stage 210–270 other than required by the logical dependencies described in the flow diagram. For example, stage 210 can either precede, follow or occur contemporaneously with stages 220–240 or stages 250–270. However, stages 220, 230 and 240 preferably take place in order, just as stages 250, 260 and 270.

Since only a very limited amount of information needs to be transferred over communications pathways 130 between server/host computer 110 and client/terminal computers 120, the communication network bandwidth required for efficient operation of computer gaming system 100 is in the order of 10 MB/s. This bandwidth requirement can be further reduced using data compression techniques to about 100 KB/sec.

In some embodiments, images transmitted between server/host computer 110 and client/terminal computers 120 are cached on client/terminal computers 120 to reduce the amount of network bandwidth required for the operation of computer gaming system 100. In some embodiments, to further reduce the amount of network bandwidth required for the operation of computer gaming system 100, image updates (once an image has been displayed) are limited to areas of the screen that are actually modified rather than full screen refreshes.

Moreover, in some embodiments, images for use by computer gaming system 100 are preloaded into a memory of client/terminal computers 120 to further reduce the amount of communication network bandwidth required.

Figure 3:
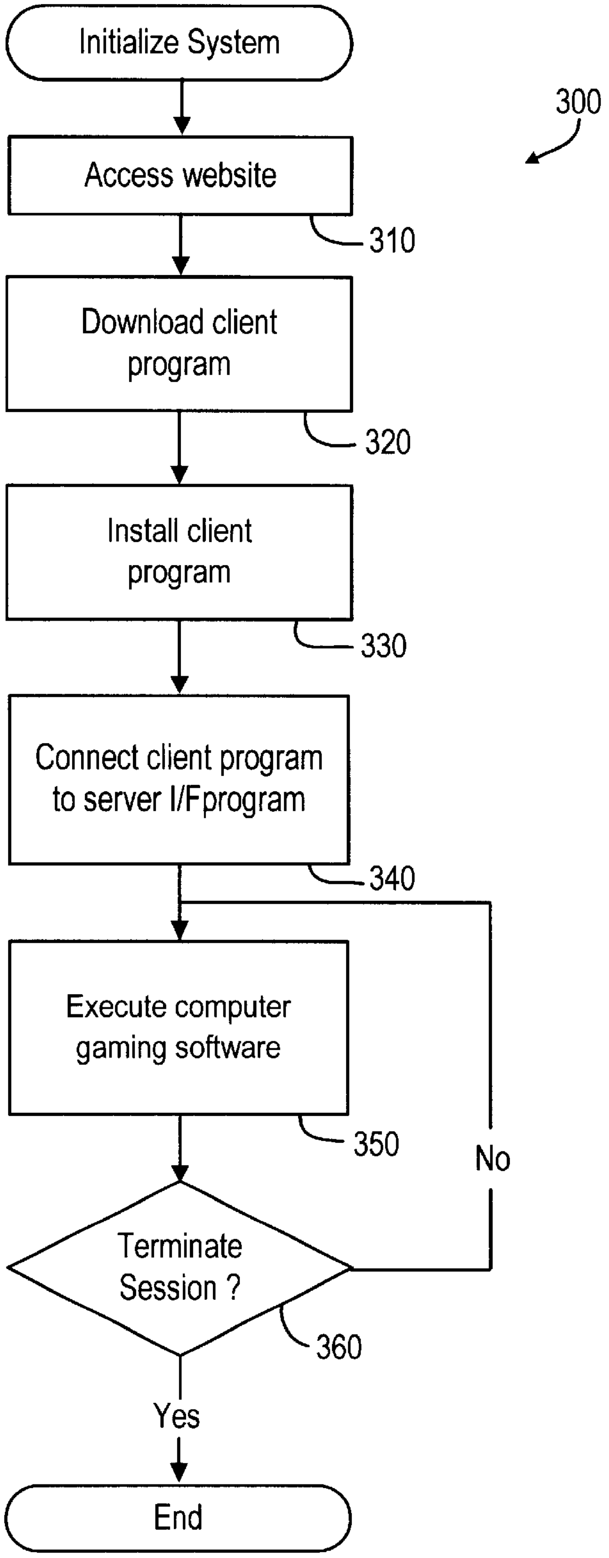
FIG. 3 is a flow diagram of the operation of computer gaming system of FIG. 1, where the communication/pathways are a global network.

When an image is either cached or preloaded in a memory of client/terminal computer 120, stage 230 of operation 200 is significantly reduced FIG. 3 is a flow diagram of operation 300 of computer gaming system 100, where communication pathways 130 are a global computer network such as the Internet. In operation 300, a user of client/terminal computer 120 connected to a global network such as the Internet first accesses a website using a web browser such as Internet Explorer 4.0, available from Microsoft Corp. of Redmond, Wash., or Netscape Navigator® 4.0, available from Netscape Communications Corp. of Mountain View, Calif., in stage 310. The patron then downloads a copy of client/terminal program 122 from the website in stage 320. The patron then installs client/terminal program 122 on client/terminal computer 120 in stage 330. Once installed on client/terminal computer 120, client/terminal program 122 connects to server/host computer interface program 114 executed on server/host computer 110 over the global network in stage 340. Finally, in stage 350, computer gaming system 100 is executed in a manner analogous to the one described for operation 200 of FIG. 2.

In some embodiments, client/terminal program 122 may be preloaded on client/terminal computer 120, in which case stages 310, 320 and 330 may be eliminated.

FIGS. 4A, 4B, 5A, 5B, 6A, 6B, 7A, 7B, 8A, 8B, 9A, 9B, 9C and 9D illustrate the images displayed on screen 140 of client/terminal computer 120 during operation 200 of computer gaming system 100.

Figure 4A:
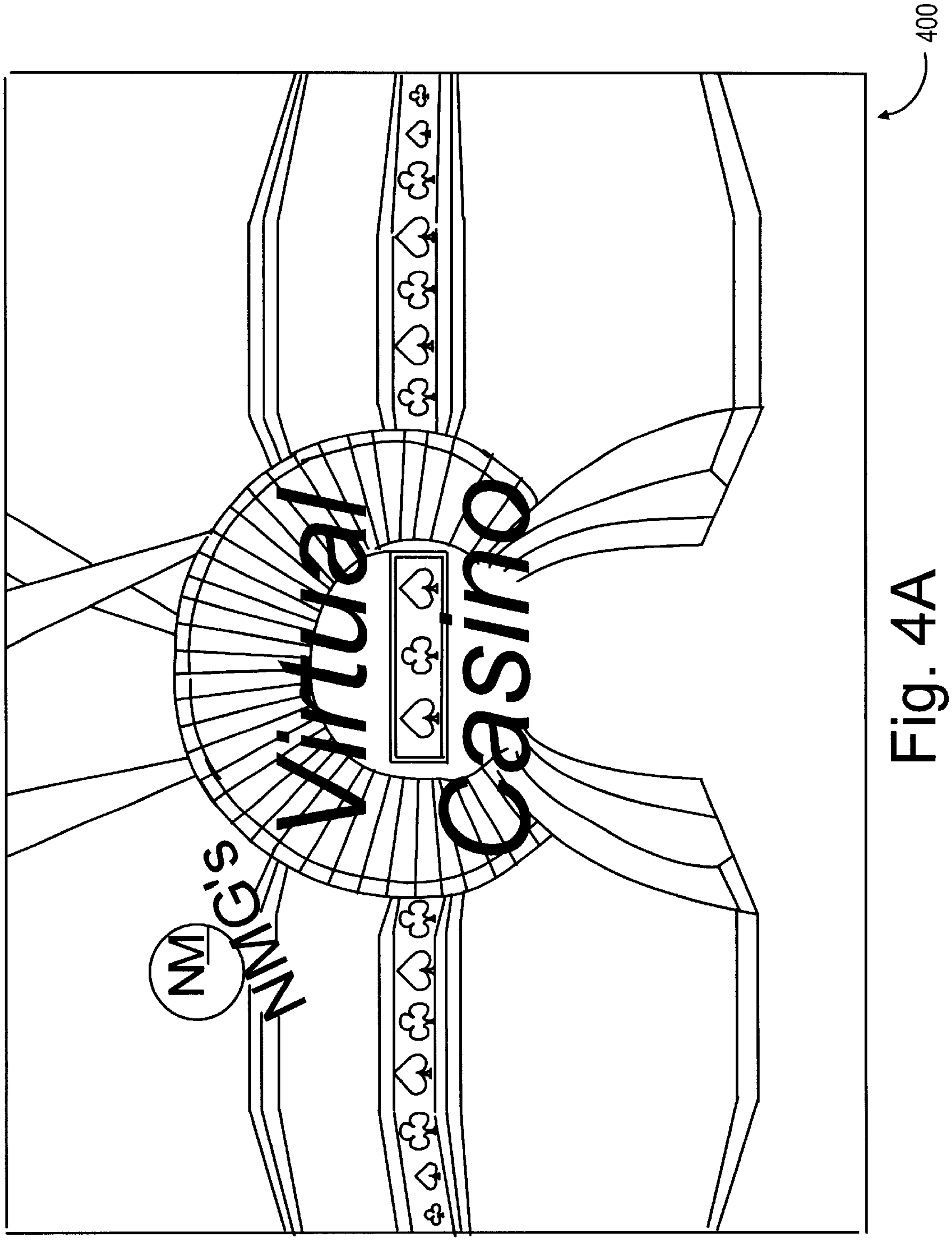
FIG. 4A is an image displayed on a screen of a client/terminal computer of FIG. 1 in attract mode.

FIG. 4A shows an "attract mode" image 400 displayed on screen 140 while computer gaming system 100 is in an attract mode. Once a user activates computer gaming system 100 by touching the surface of screen 140, a casino floor image 410 is displayed on screen 140. As explained with respect to FIGS. 1A and 2, game program 112 drives the display of images 400 and 410 via server/host interface program 114 and client/terminal program 122. Casino floor image 410 illustrates various casino games supported by computer gaming system 100. Each of the available games is represented by a "virtual" button: Bertha button 420, black jack button 430, video poker button 440, slots button 450 and keno button 460. The patron can select any of these games by touching a corresponding area of screen 140. When the patron presses a virtual button, an input command is detected by client/terminal program 122 and transmitted to server/host computer 110 over communication pathways 130. Server/host interface program 114, in turn, receives the input command and passes the input command along to game program 112. Game program 112, then responds to input command 112 by updating the state of the game and possibly modifying the image displayed on screen 140. Games may be provided either by multiple game programs 112 or by a single game program 112.

Figure 5A:
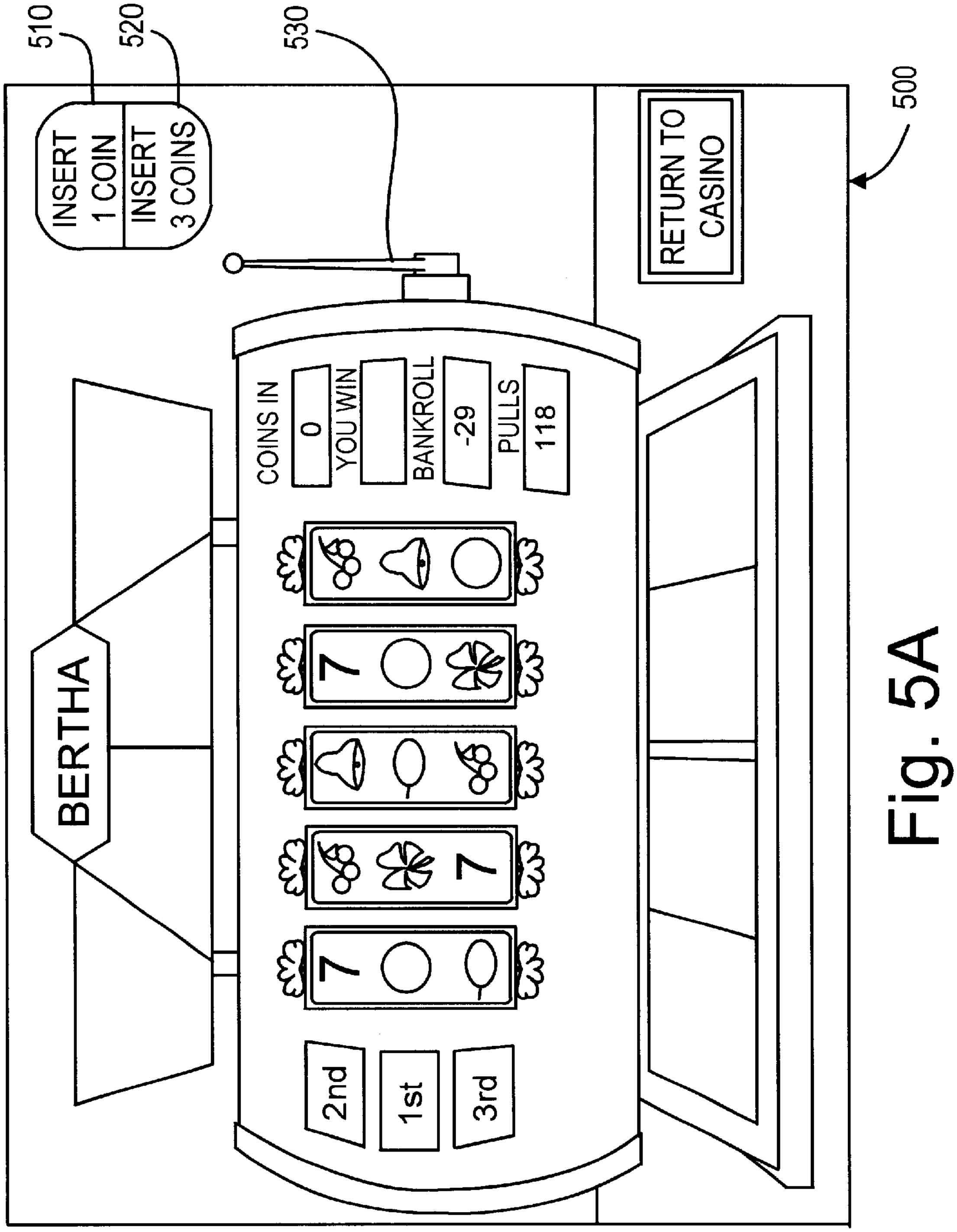
FIG. 5A is an image displayed on a screen of a client/terminal computer of FIG. 1, showing a front view of a slot machine.

FIG. 5A illustrates Bertha image 500, that is displayed in response to the patron pressing Bertha virtual button 420

Figure 4B:
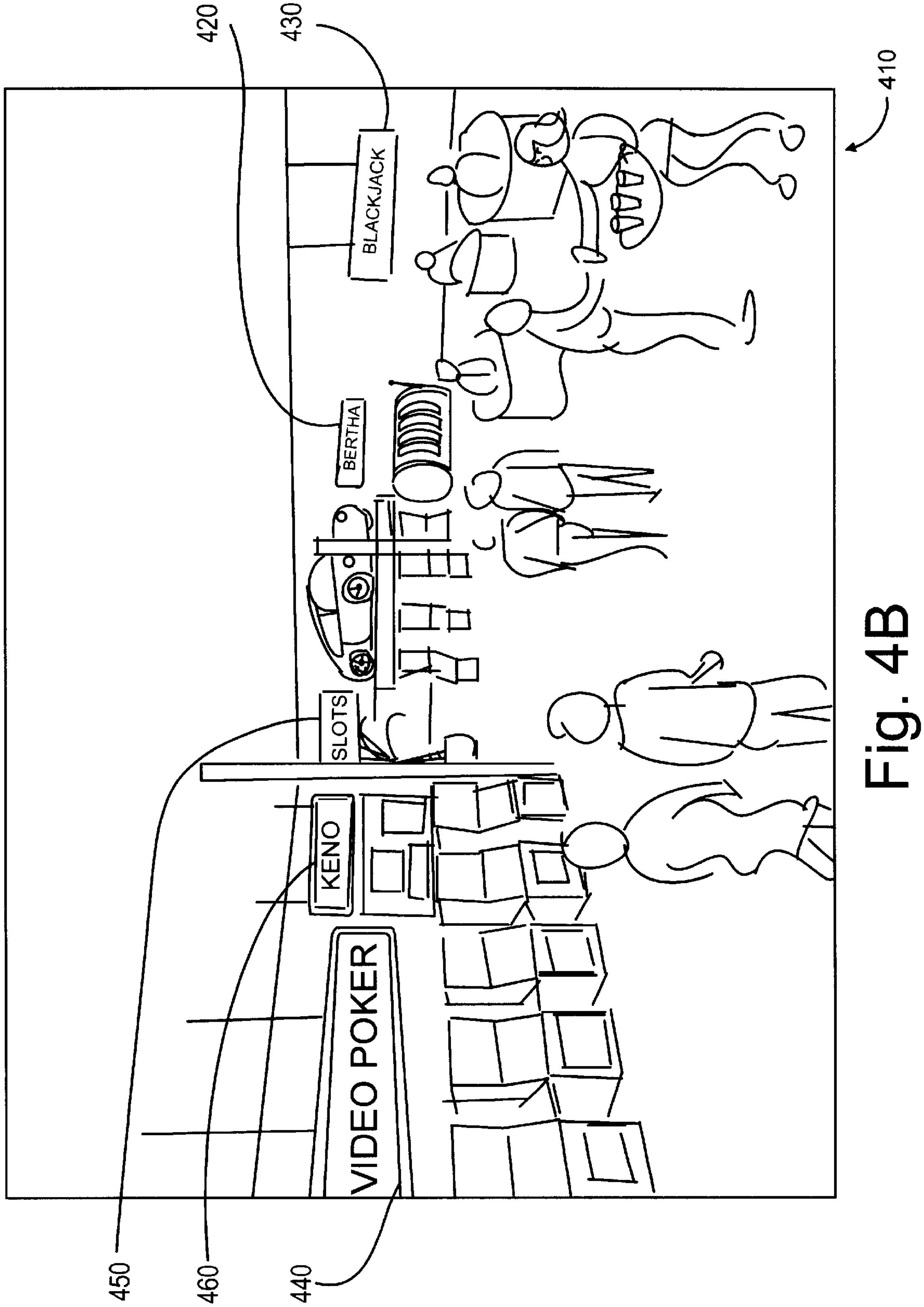
FIG. 4B is an image displayed on a screen of a client/terminal computer of FIG. 1, showing a virtual casino floor.

(FIG. 4B). Bertha image 500 shows a front view of a slot machine, also known as "big Bertha." The patron may "virtually" insert coins into the slot machine by pressing coin buttons 510 or 520. Once coins have been inserted into the slot machine, the patron can "pull a lever" to activate the slot machine by pressing lever button 530.

Figure 5B:
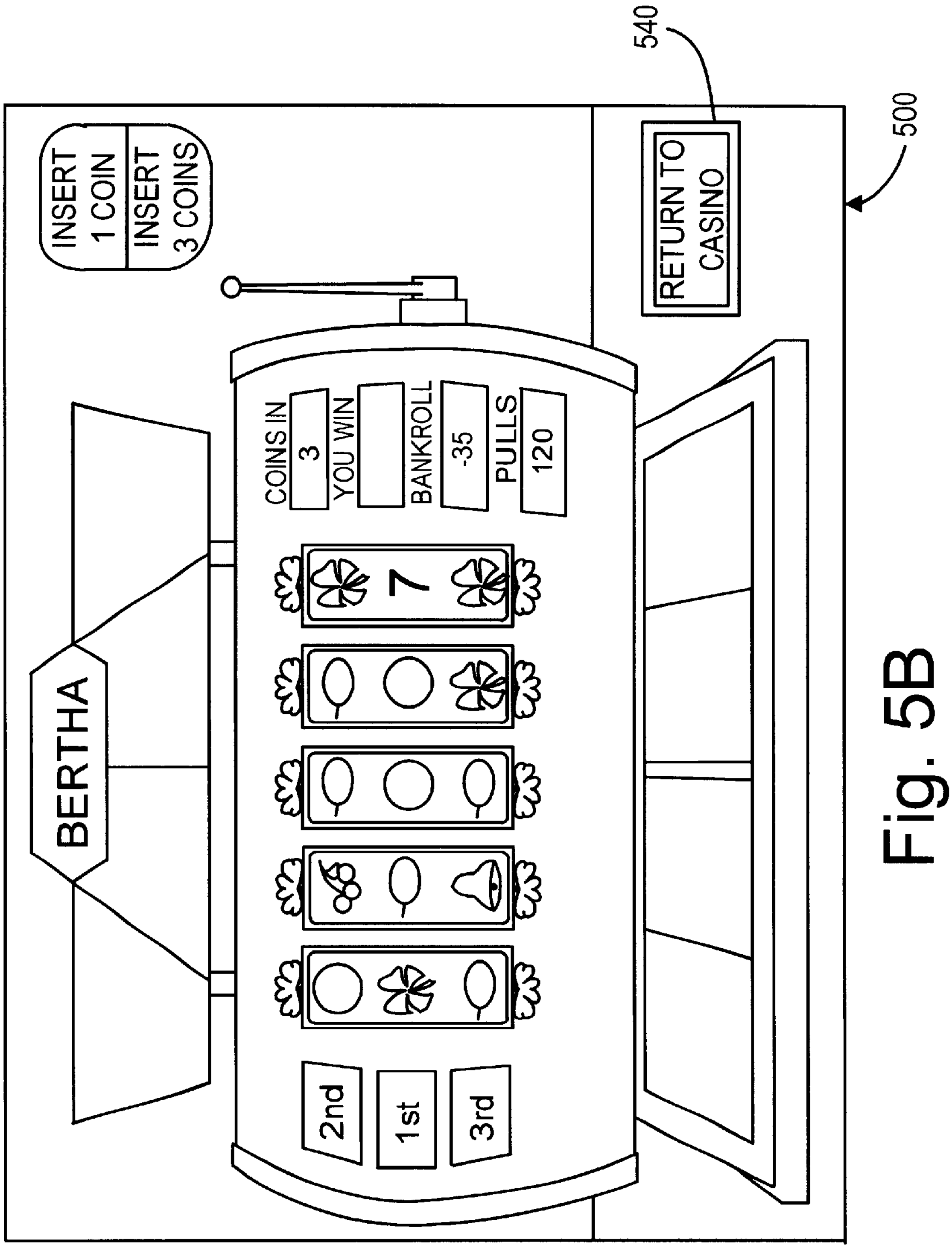
FIG. 5B is an image of the slot machine of FIG. 5A, after spinning the reel.

FIG. 5B illustrates Bertha image 500 after the lever has been pulled. The patron can repeat the operation by inserting new coins and pulling the lever again. The patron may then leave the slots by pressing the casino button 540, causing casino floor image 410 to be again displayed on screen 140.

Figure 6A:
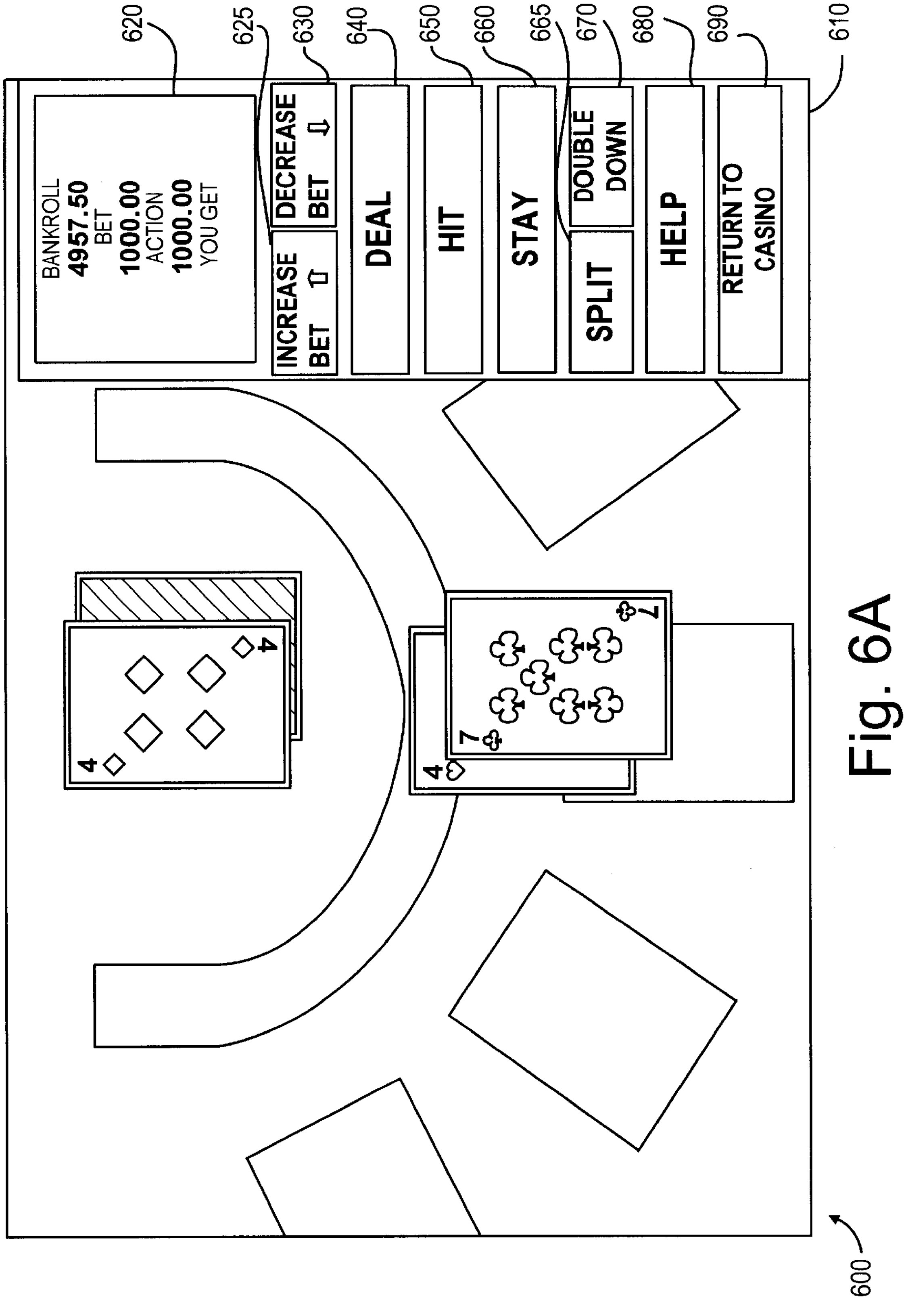
FIG. 6A is an image displayed on a screen of a client/terminal computer of FIG. 1, showing a top view of a black jack table.

FIG. 6A illustrates black jack table image 600, that is displayed in response to the patron pressing blackjack virtual button 430 (FIG. 4B). Blackjack table image 600 shows a top view of a blackjack table. Blackjack table image 600 also includes a control pad 610. Control pad 610 contains a status board 620 and several virtual buttons: increase wager bet button 625, decrease wager bet button 630, deal button 640, hit button 650, stay button 660, split button 665, double down button 670, help button 680 and return to casino button 690. Status board 620 provides information about game status, such as the patron's bankroll, wager bet amount, etc. Increase wager bet button 625 and decrease wager bet button 630 are used to alter the amount of the wager bet shown on status board 625. Deal button 640, hit button 650, stay button 660, split button 665 and double down button 670 allow a patron to provide input commands to game program 112. The functions performed by game program 112 when these buttons are pressed are in accordance with the rules of the game of black jack.

If a patron is unfamiliar with the rules of the game of black jack, or needs other assistance, the patron can access a help facility by pressing help button 680. Finally, the patron may leave the black jack table by pressing return to casino button 690, causing casino floor image 410 to be again displayed on screen 140.

To play a hand of black jack, the patron first places a wager bet by pressing increase wager bet button 625 and/or decrease wager bet button 630 until the correct amount is shown on status board 620 and then pressing deal button 640. Two cards are then dealt face up to the patron, as shown in FIG. 6A. The casino dealer is dealt one card up and one card down. The patron can then elect to hit, stay, split or double down by pressing a corresponding virtual button. When the patron presses stay button 660, or the value of the cards in the user's hand exceeds twenty-one, the casino dealer uncovers the down card and draws additional cards until the casino dealer reaches a score of seventeen or higher (eighteen or higher, depending on the house rules). The patron wins if the cards in the patron's hand have a higher value than the cards in the casino dealer's hand without exceeding twenty-one or if the cards in the patron's hand do not exceed twenty-one and the cards in the casino dealer's hand exceed twenty-one. If the cards in the patron's hand and the cards in the casino dealer's hand have the same value, the hand results in a tie and the patron retains the bet. If the patron wins the hand, the casino bank pays the patron an amount equal to the bet, unless the patron's hand is twenty-one, in which case the casino bank pays one and a half times the patron's bet. If the patron loses the hand, the casino bank collects the patron's bet.

Figure 6B:
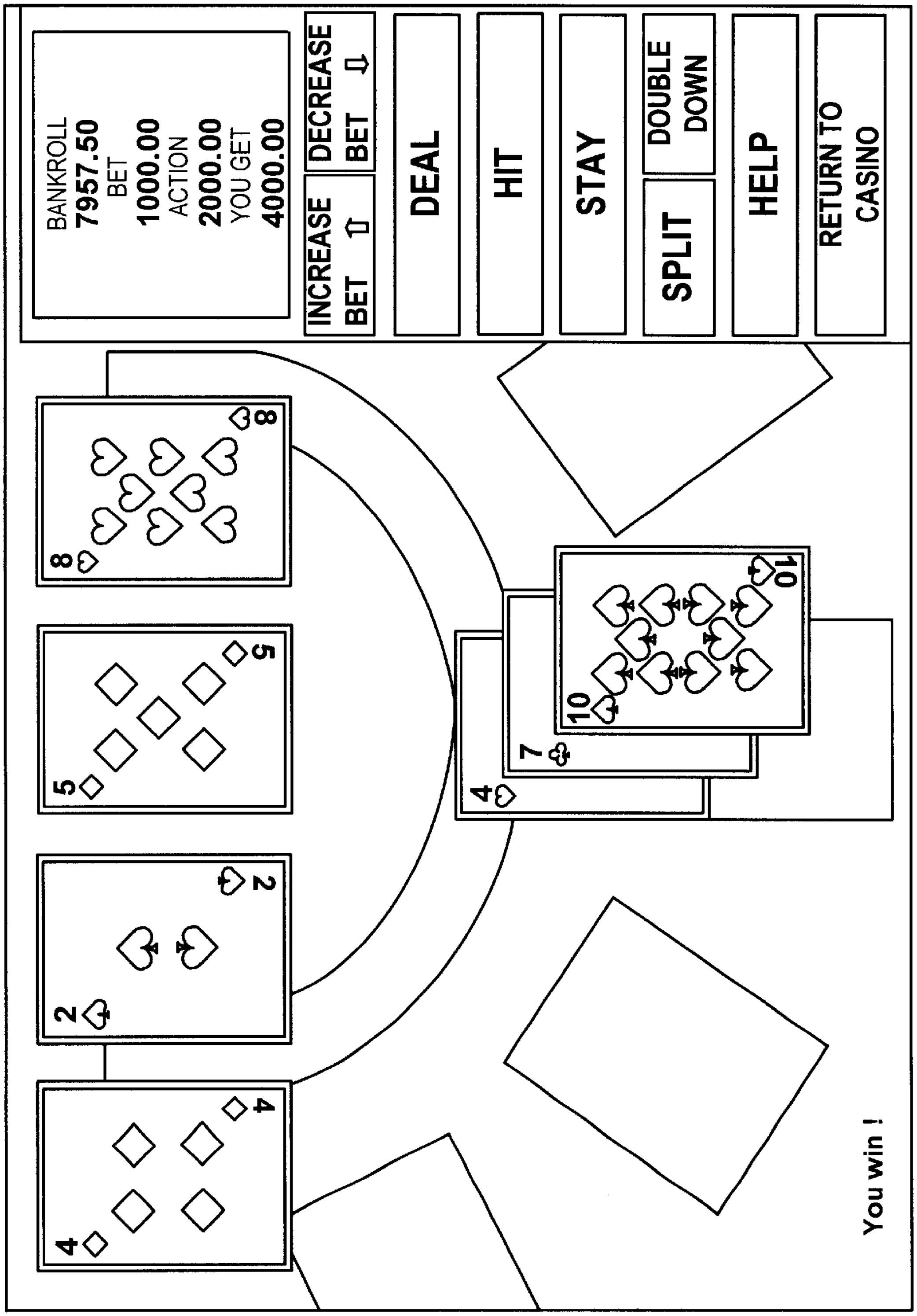
FIG. 6B is an image of the slot machine of FIG. 6A, after playing a hand of black jack.

FIG. 6B illustrates black jack table image 600 after the patron has elected to double down by pressing double down button 670. As shown in FIG. 6B, the patron's score is twenty-one (black jack) and the casino dealer's score is nineteen. Since the patron's initial bet is $1,000 (FIG. 6A), the amount paid by the casino bank to the patron is first doubled (double down) and then paid at a time and a half (black jack). As a result, the patron's bankroll shown on status board 625 after the hand is played is increased by $3,000.

Figure 7A:
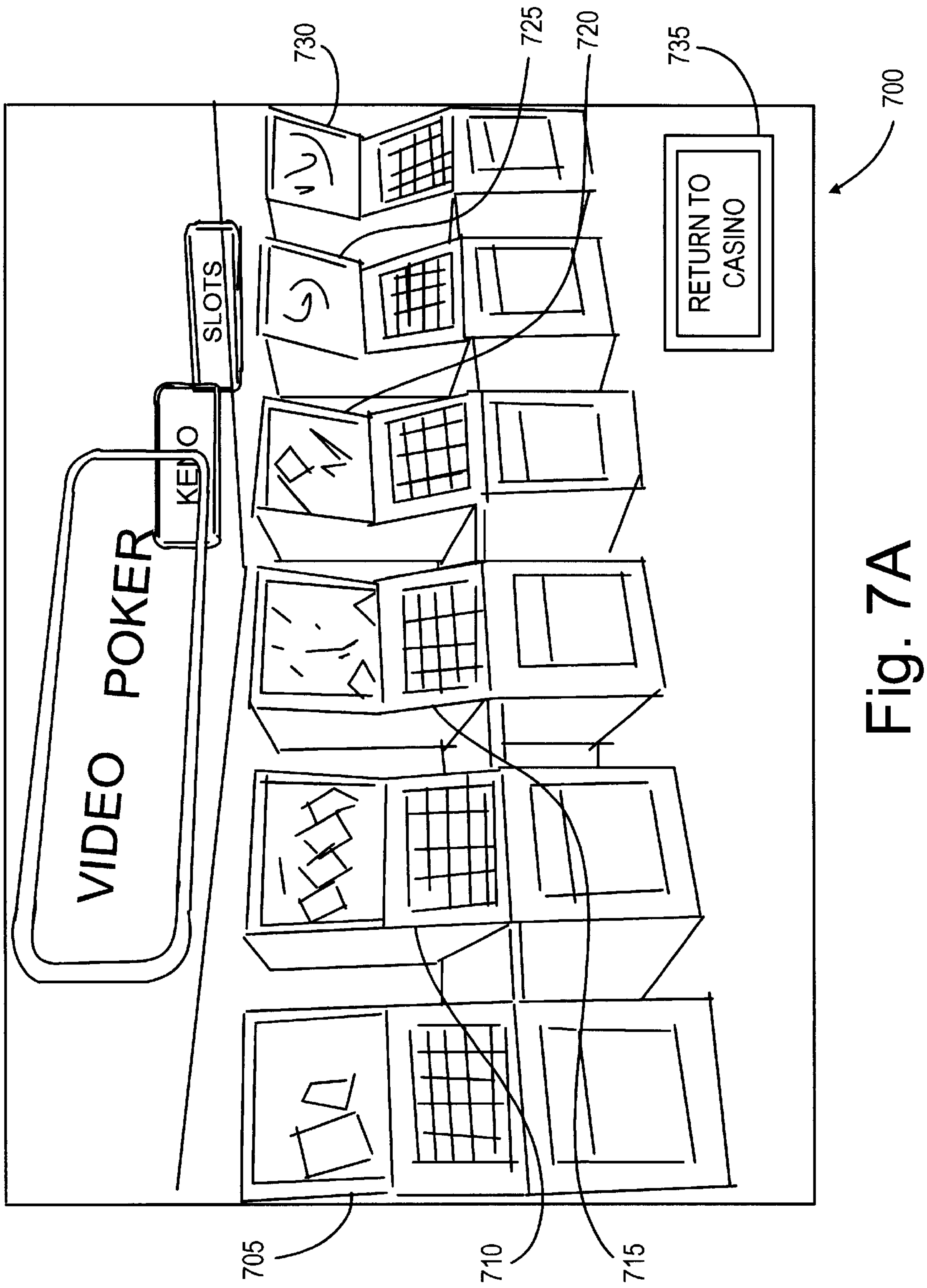
FIG. 7A is an image displayed on a screen of a client/terminal computer of FIG. 1, showing a video poker area of the virtual casino floor of FIG. 4B.

FIG. 7A shows video poker image 700 that is displayed in response to the user pressing video poker button 440 (FIG. 4B). Video poker image 700 is a front view of a video poker area of the casino floor that includes joker poker button 705, jacks or better button 710, deuces wild button 715, double down button 720, no bonus poker button 725 and bonus poker button 730. Each of virtual buttons 705, 710, 715, 720, 725 and 730 allows the user to access a particular video poker game by pressing the corresponding virtual button.

Figure 7B:
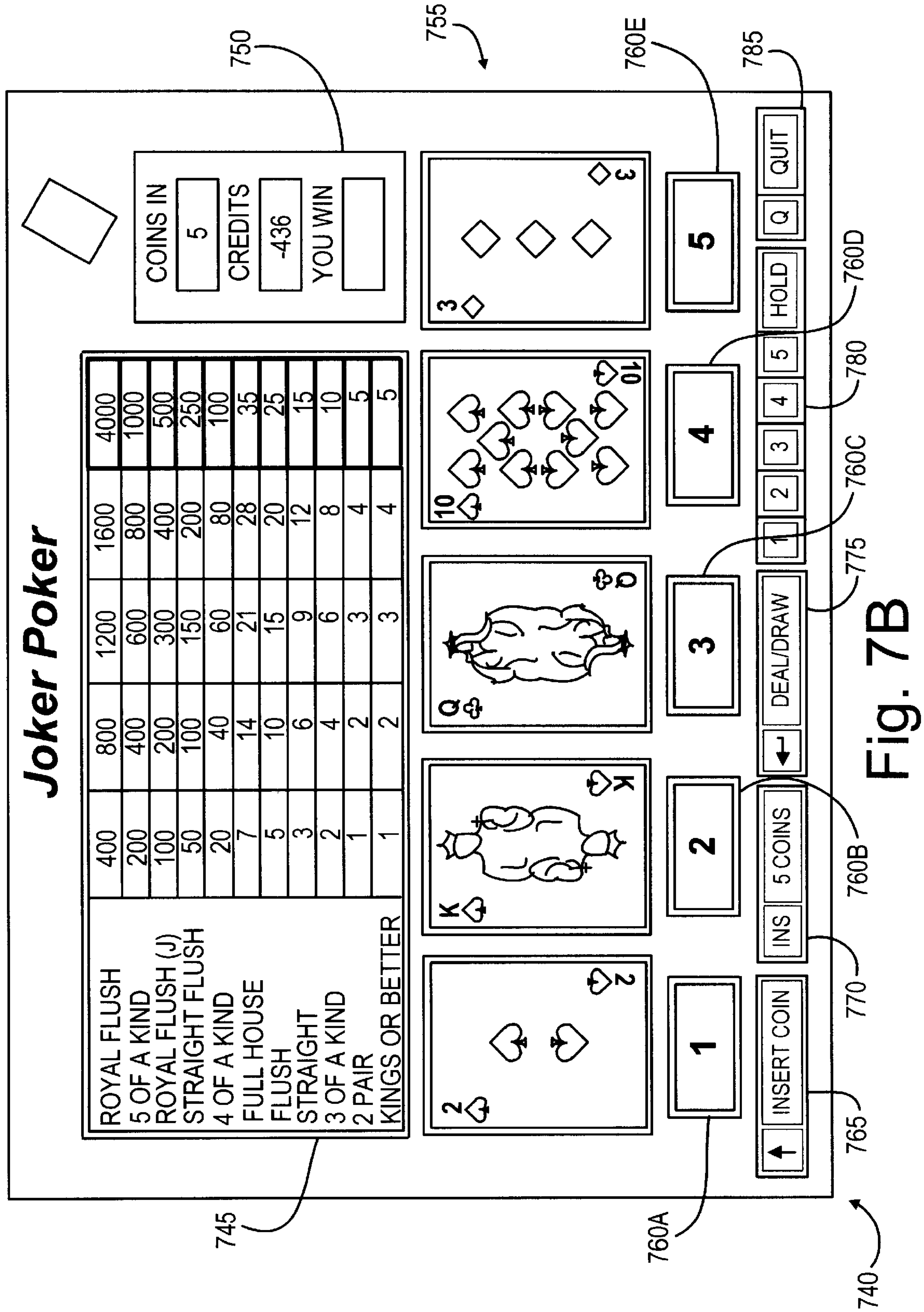
FIG. 7B is an image of a video poker board shown on a screen of a client/terminal computer of FIG. 1.

FIG. 7B shows joker poker image 740 displayed in response to the user pressing joker poker button 705. Joker poker image 740 includes a pay table 745, a status board 750, a card area 755, card buttons **760*n* (where n=A, B, C, D, E), insert coin button 765, insert five coins button 770, deal/draw button 775, hold button 780 and quit button 785. Pay table 745 shows the amount paid by the casino bank for a given score depending on the number of coins bet. For example, in FIG. 7B, the right-most column of pay table 745 is highlighted to indicate the payout for a five coin bet. Status board 750 shows game status information such as the patron's bankroll, the amount of the current bet, etc. Card area 755 shows the cards in the patron's hand. Card buttons 760*n* are used to select cards to be held. Insert coins button 765 and insert five coins button 770 are used to enter a bet. Deal/draw button 775 and hold button 780 are used to provide input commands to game program 112. The functions performed by game program 112 when these buttons are pressed are in accordance with the rules of the game of joker poker. Finally, the patron may elect to return to the video poker area of the casino floor by pressing quit button 780, causing video poker image 700 to be again displayed on screen 140**.

To play a hand of joker poker, the patron first places a bet by pressing insert coin button 765 or insert five coins button 770. When the desired bet amount is shown on status board 750, the patron may enter the bet by pressing deal/draw button 775. Five cards are then shown face up in cards area 755. The patron can then select which cards to hold by pressing a corresponding button **760*n*. The patron can hold all cards in the hand by pressing hold button 780. Otherwise, the patron can draw additional cards to replace discarded cards by pressing deal/draw button 775. The patron wins if the cards in the patron's hand, after pressing hold button 780 or deal/draw button 775, constitute a point listed on pay table 745, in which case the corresponding amount listed on the highlighted portion of pay table 745** is paid by the casino bank to the patron Otherwise, the casino bank collects the patron's bet.

Figure 8A:
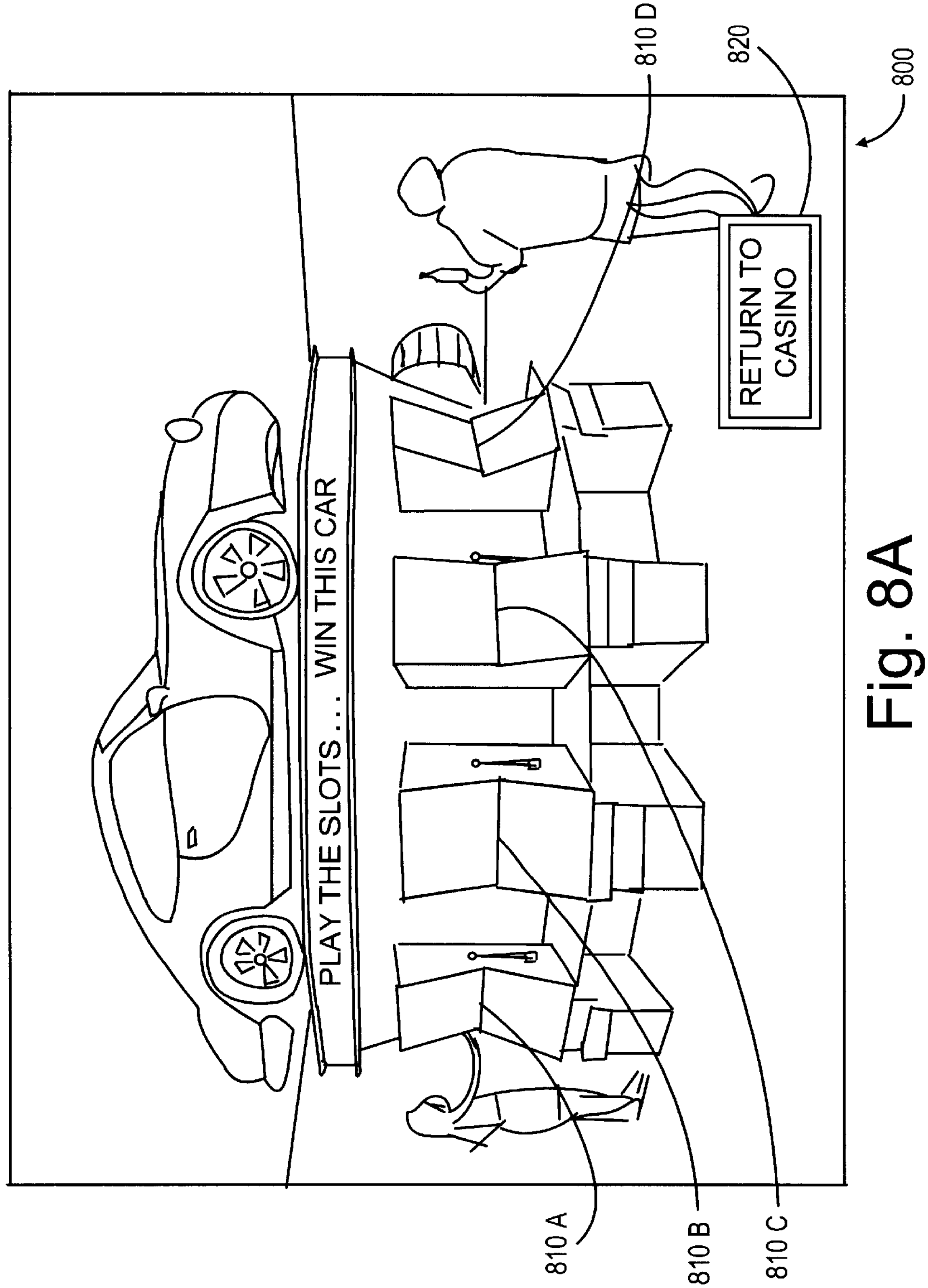
FIG. 8A is an image displayed on a screen of a client/terminal computer of FIG. 1, showing a slot machine area of the virtual casino floor of FIG. 4B.

FIG. 8A shows slots image 800 displayed in response to the user pressing slots button 450 (FIG. 4B). Slots image 800 includes slots buttons 810n (where n=A, B, C, D) and return to casino button 820. The patron can select a "virtual" slot machine by pressing one of slot buttons 810n. The patron can also return to the casino floor by pressing return to casino button 820, causing casino floor image 410 to be again displayed on screen 140.

Figure 8B:
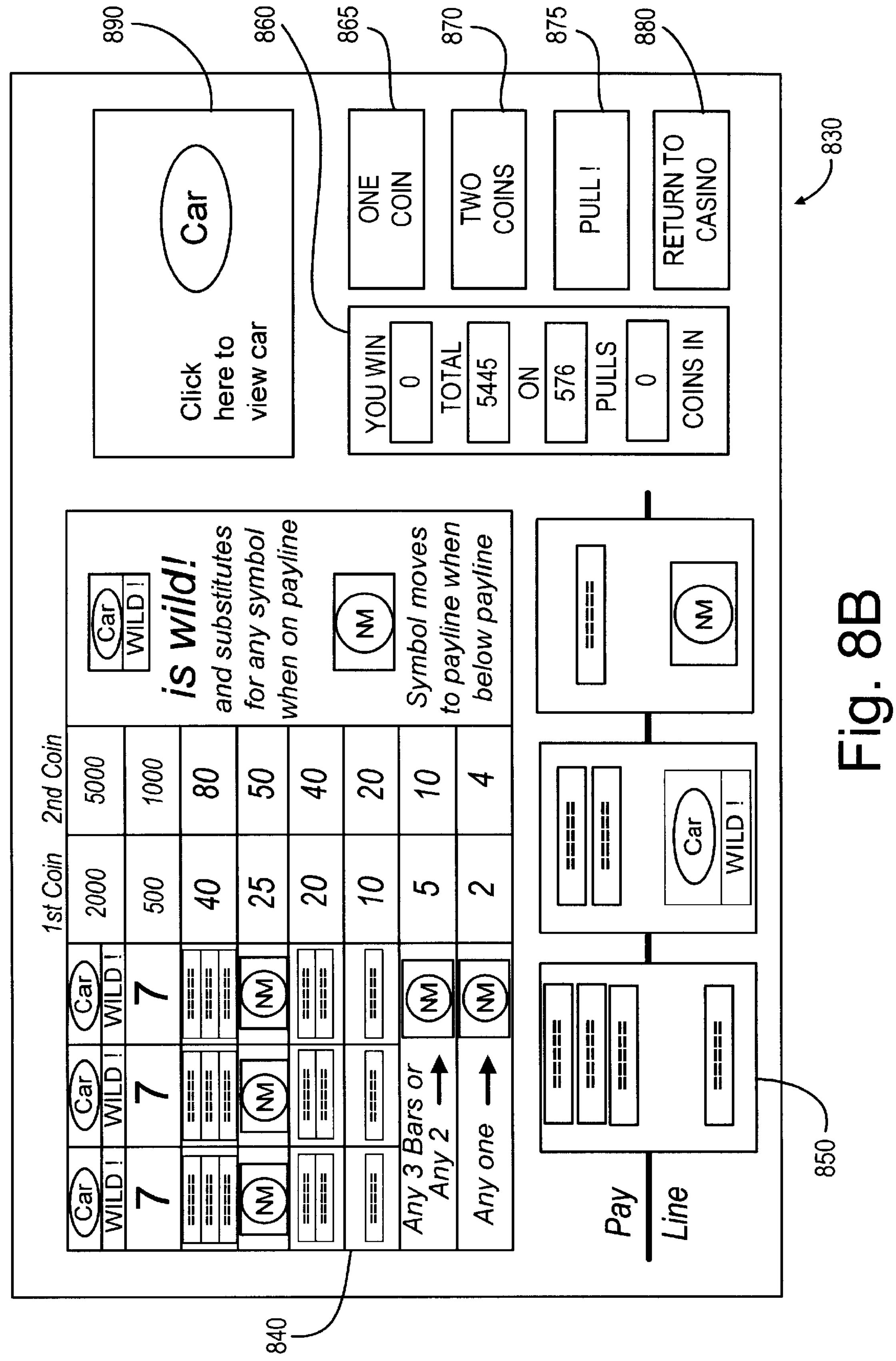
FIG. 8B is an image of a slot machine board shown on a screen of a client/terminal computer of FIG. 1.

FIG. 8B shows slot machine image 830 displayed in response to the user pressing one of slots buttons **810*n*. Slot machine image 830 shows a front view of a slot machine including a pay table 840, reels 850, status board 860, one coin button 865, two coins button 870, pull button 875, return to casino button 880 and prize window 890**.

Pay table 840 shows the amount paid by the casino bank for a given score depending on the number of coins bet. Reels 850 simulate turning of mechanically implemented slot machine from a prior era. Status board 860 shows game status information such as the patron's bankroll, the amount of the current bet, etc.

To play the virtual slot machine, the patron first places a bet by pressing either one coin button 865 or two coin button 870. The patron then presses pull button 875, causing reels 850 to "spin." When the virtual reels stop spinning, if the reels stop in a position corresponding to one of the points shown on pay table 840, the casino bank pays the patron the corresponding number of coins listed in pay table 840 for the patron's bet. Otherwise the casino bank collects the patron's bet.

Prize window 890 is a sub-window of slots image 830 that displays an animated and dynamically variable image of a prize that also appears on reels 850 and pay table 840. If reels 850 stop on a position corresponding to the prize shown in prize window 890, the patron wins the prize shown in prize window 890. In some embodiments, in which multiple client/terminal computers 120 are connected to server/host computer 110, prize window 890 can be used to temporarily move a prize around games played on different client/terminal computers 120. In other embodiments, patrons may either accept or reject the opportunity of playing for the prize shown in prize window 890 by either pressing or not pressing a virtual button on prize window 890. Moreover, in some embodiments, prize window 890 is used to display marketing information to the patrons.

Figure 9A:
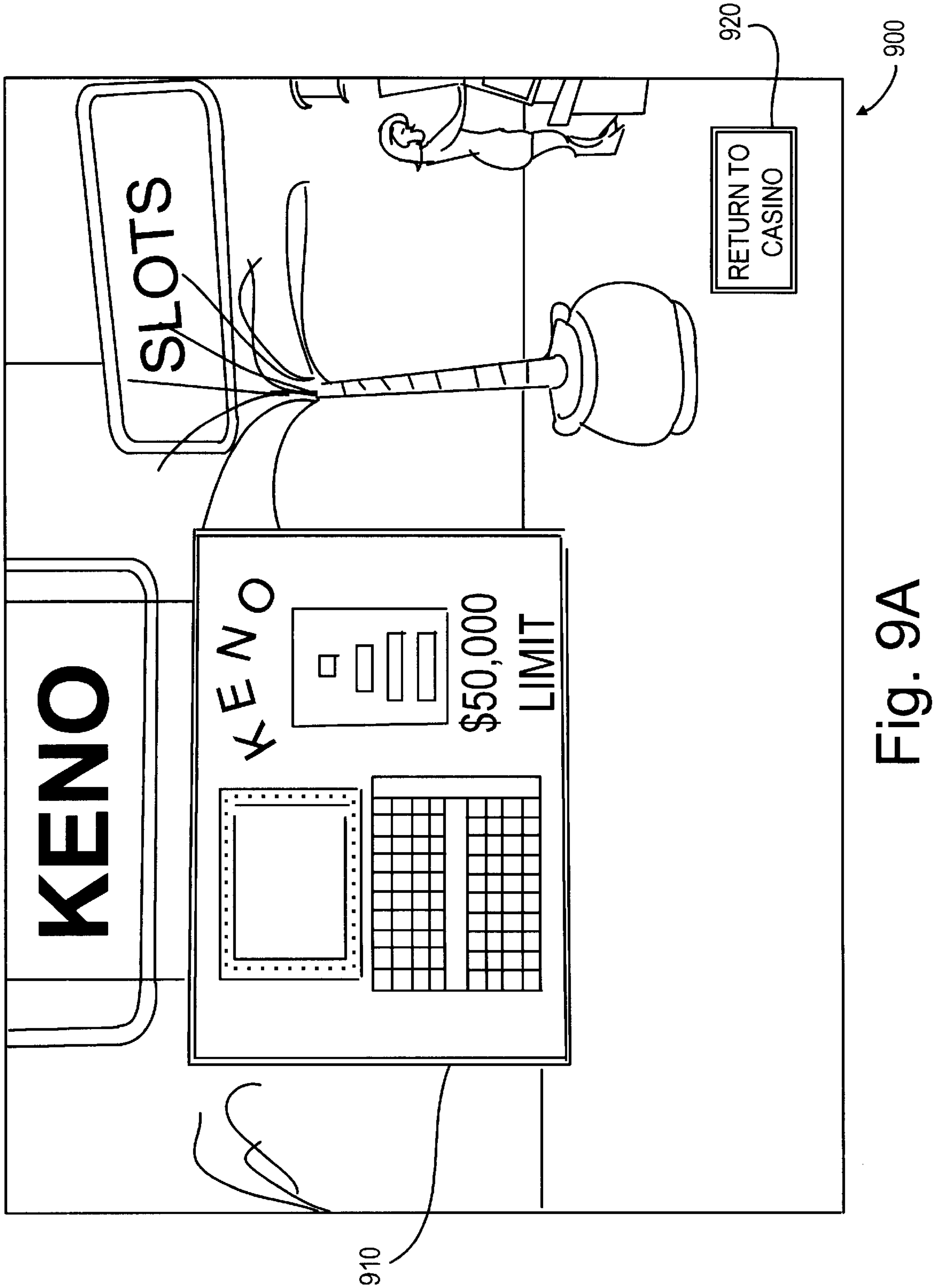
FIG. 9A is an image displayed on a screen of a client/terminal computer of FIG. 1, showing a keno area of the virtual casino floor of FIG. 4B.

FIG. 9A shows keno area image 900 displayed in response to the user pressing keno button 460 (FIG. 4B). Keno area image 900 includes keno button 910 and return to casino button 920. The patron can enter the keno game by pressing keno button 910. The patron can also return to the casino floor by pressing return to casino button 820, causing casino floor image 410 to be again displayed on screen 140.

Figure 9B:
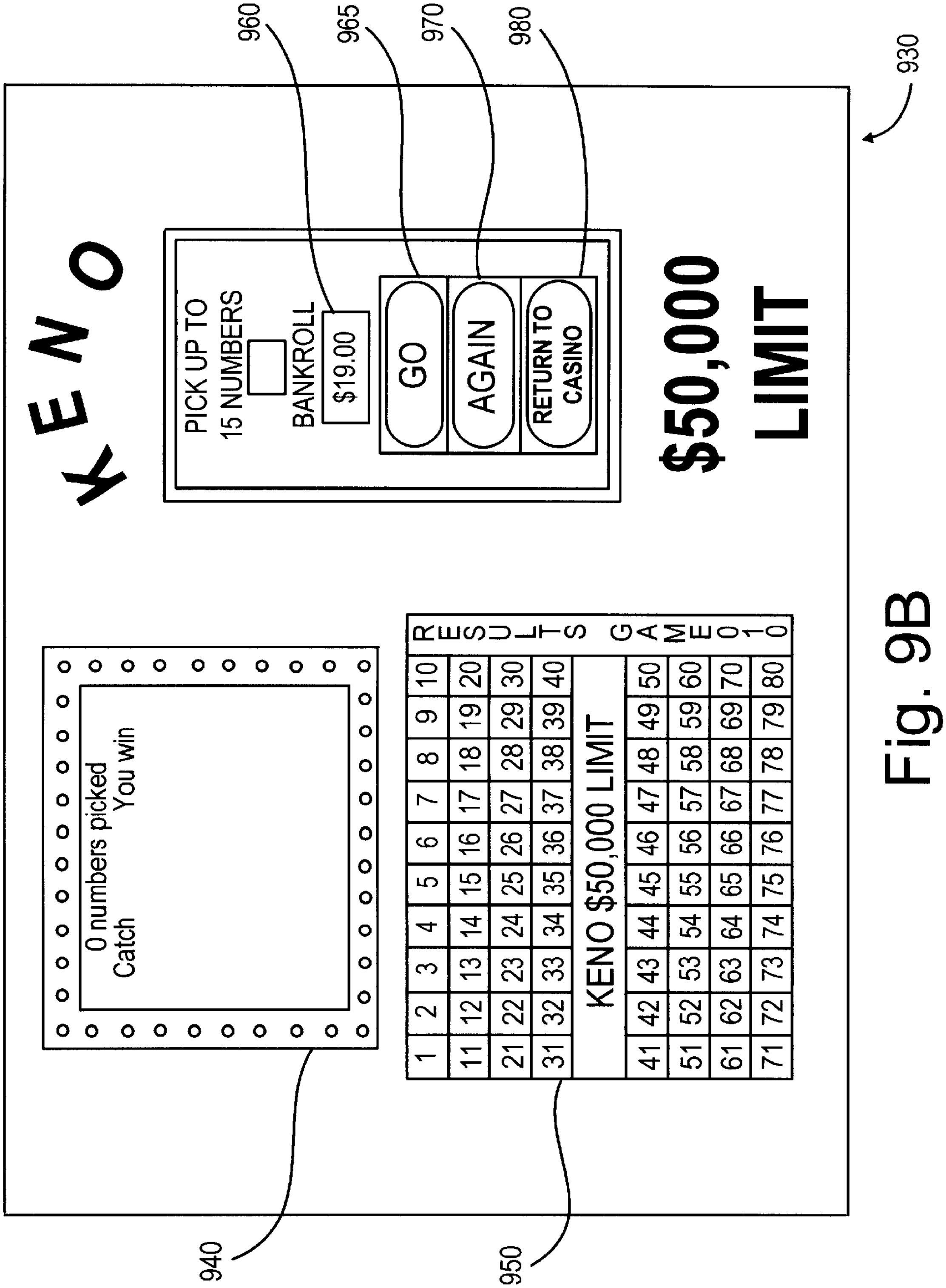
FIG. 9B is an image of a keno board shown on a screen of a client/terminal computer of FIG. 1.

FIG. 9B shows keno board image 930 displayed in response to the user pressing keno button 910. Keno board image 930 includes a pay table 940, a keno board 950, a status board 960, a go button 965, an again button 970 and a return to casino button 980.

Figure 9C:
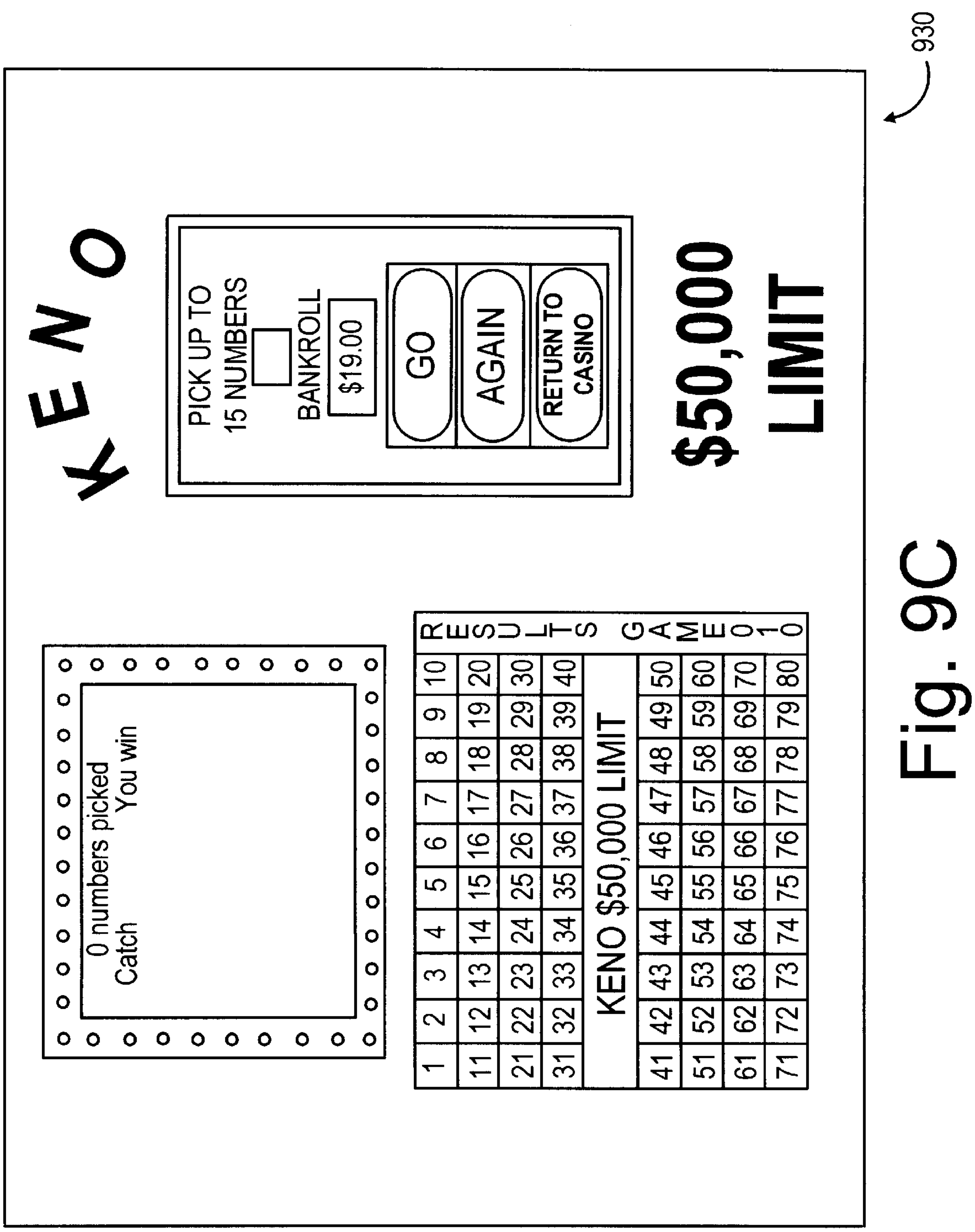
FIG. 9C is an image of a keno board shown on a screen of a client/terminal computer of FIG. 1, after the user has picked a plurality of numbers from the keno board.
Figure 9D:
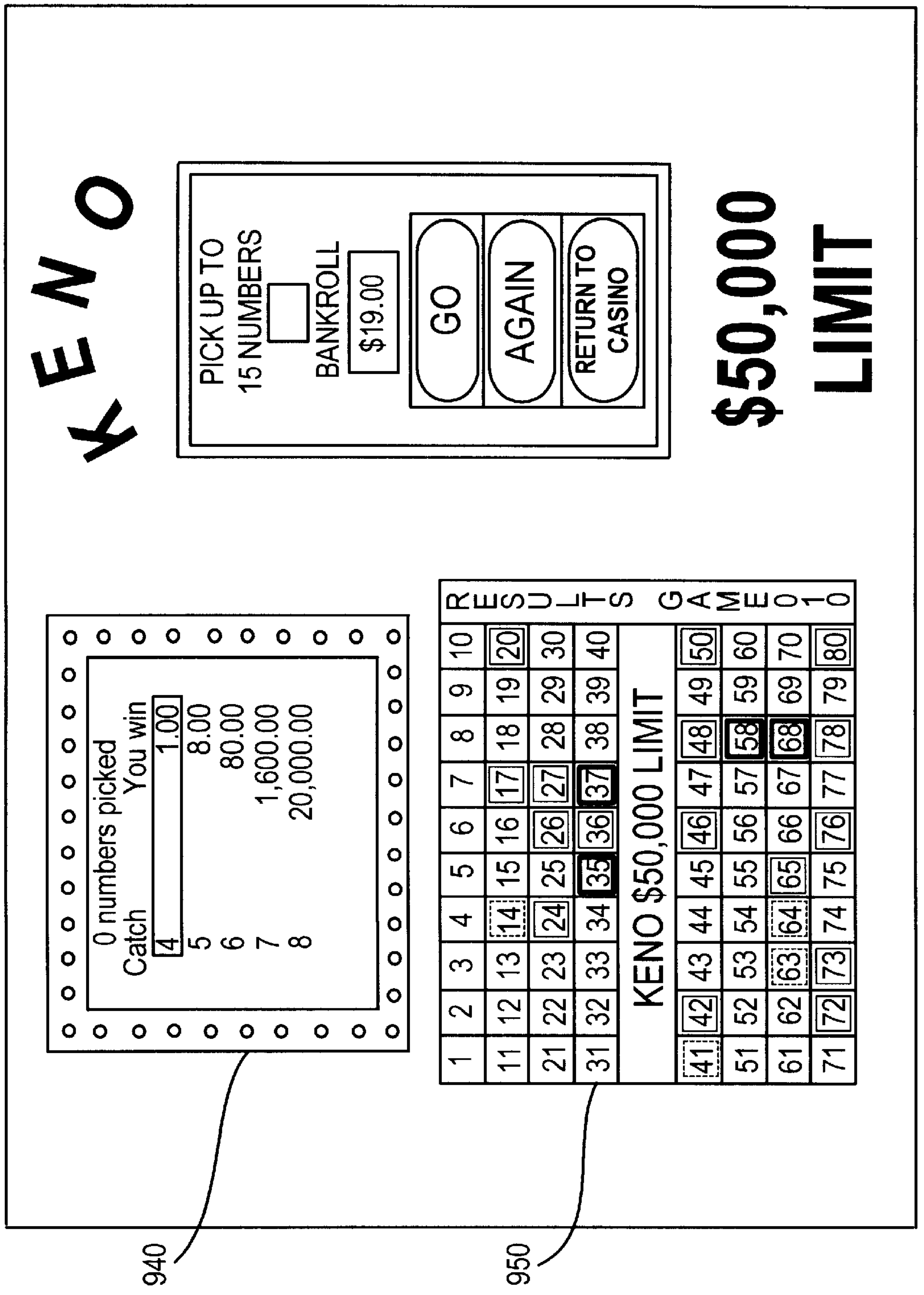
FIG. 9D is an image of a keno board shown on a screen of a client/terminal computer of FIG. 1, after keno numbers have been electronically drawn and shown on the keno board.

To play a round of keno, the patron first places a bet by picking up to fifteen numbers on keno board 950 and then pressing go button 965 (FIG. 9C). Twenty-five numbers are then electronically drawn and the corresponding locations on keno board 950 are highlighted (FIG. 9D). Pay table 940 shows the amounts paid by the casino bank depending on the number of correct picks by the patron. If the patron's pick include a number of matches shown on pay table 940, the casino bank pays a corresponding amount to the patron, otherwise the casino bank collects the bet from the patron.

Sun is a registered trademark and JAVA, SPARC and Solaris are trademarks of Sun Microsystems, Inc. of Mountain View Calif. Intel and Pentium are registered trademarks of Intel Corp. of Santa Clara, Calif. Windows NT, MS-DOS, Window95, Windows98 and Windows2000 are registered trademarks and Windows NT Server 4.0 Terminal Server Edition and RDP are trademarks of Microsoft, Corp. of Redmond Wash. Mac is a registered trademark and Mac OS is a trademark of from Apple Computer, Inc. of Cupertino, Calif. WinTerm is a trademark of Wyse Technology, Inc. of San Jose, Calif. Citrix, ICA and WinFrame are registered trademarks and MetaFrame is a trademark of Citrix Systems, Inc. of Ft. Lauderdale Fla. Tarantella is a trademark of The Santa Cruz Operation, Inc. of Santa Cruz, Calif. Go-Global and Go-Between are trademarks of Graphon Corp. of Campbell Calif. Netscape Navigator is a registered trademark of Netscape Communications Corp. of Mountain View, Calif. Liftoff is a trademark of New Moon Software, Inc. of Santa Clara, Calif. pSOS is a trademark of Integrated Systems, Inc. of Santa Clara, Calif. QNX is a trademark of QNX Software Systems Ltd. Of Kanata, Canada.

Embodiments described above illustrate but do not limit the invention. In particular, the invention is not limited to any particular game. In fact, any casino game or other non-casino games where players play against each other for money with the house taking a percentage of the stake for providing the game. Games such as chess, backgammon, hearts or poker can be used in place of the games described herein. In addition, the invention is not limited to any particular software or hardware package used to implement the server/host operating system or interface or the client/terminal interface or program. In fact, other software and hardware packages could be used in place of the ones described herein, in accordance to the principles of the invention. Other embodiments and varieties are within the scope of the invention, as defined by the following claims.

We claim:

1. A computer gaming system comprising:

one or more server/host computers;

one or more client/terminal computers for connection to the server/host computers via communication pathways;

one or more computer gaming programs executed on at least one server/host computer but not on any of the client/terminal computers;

a server/host interface program executed on each server/host computer; and a client/terminal program executed on each client/terminal computer;

wherein the computer gaming program executed on the server/host computer separates input and output streams at an application layer of a protocol stack, and redirects the input and output streams over the communication pathways to the client/terminal computers via the server/host interface program and the client/terminal program.

2. The computer gaming system of claim 1, wherein an input command detected during execution of the client/terminal program on one of the client/terminal computers is transmitted to the server/host computer executing the computer gaming program over the communication pathways and, in response to the input command, the execution of the computer gaming program on the server/host computer is altered.

3. The computer gaming system of claim 1, wherein the computer gaming program is a casino gaming program.

4. The computer gaming system of claim 1, wherein at least one client/terminal computer further comprises a touch screen display device.

5. The computer gaming system of claim 4, wherein at least one client/terminal computer further comprises a wager-acceptor device.

6. The computer gaming system of claim 1, wherein two or more computer gaming programs are executed on the server/host computers and the input and output streams of the computer gaming programs are redirected to one or more client/terminal computers.

7. The computer gaming system of claim 6, wherein the input and output streams of a first computer gaming program executed on one of the server/host computers are redirected to a first plurality of client/terminal computers and the input and output streams of a second computer gaming program executed on one of the server/host computers are redirected to a second plurality of client/terminal computers.

8. The computer gaming system of claim 7, wherein the input and output streams of both the first and the second computer gaming programs executed on one of the server/host computers are redirected to a same client/terminal computer.

9. The computer gaming system of claim 8, wherein the input and output streams of the first gaming program are redirected to a window displayed on a screen of the client/terminal computer and the input and output streams of the second gaming program are redirected to a sub-window of the window displayed on the screen of the client/terminal computer.

10. The computer gaming system of claim 1, wherein the communication pathways comprise a local area network or a wide area network.

11. The computer gaming system of claim 1, wherein at least one client/terminal computer further comprises:

a head-mounted display device;

a joystick input device; and wireless communication pathways.

12. The computer gaming system of claim 1, wherein the communication pathways comprise a global network.

13. The computer gaming system of claim 12, wherein the client/terminal program is first downloaded from one of the server/host computers to one of the client/terminal computers over the global network.

14. The computer gaming system of claim 13, wherein a patron of one of the client/terminal computers requests that the client/terminal program be downloaded from one of the server/host computers by accessing a web page.

15. A method of operating a computer gaming system comprising one or more server/host computers, one or more client/terminal computers and communication pathways connecting the client/terminal computers to the server/host computers, the method comprising:

executing one or more computer gaming programs on at least one server/host computer;

executing a server/host interface program on at least one server/host computer;

executing a client/terminal program on each client/terminal computer; and separating input and output streams of the computer gaming program and redirecting the input and output streams to the client/terminal computers via the server/host interface program and the client/terminal program.

16. The method of claim 15, further comprising:

transmitting over the communications pathways an input command detected during execution of the client/terminal program on one of the client/terminal computers to the server/host computer executing the computer gaming program; and in response to the input command, altering the execution of the computer gaming program on the server/host computer.

17. The method of claim 15, wherein the computer gaming program is a casino gaming program.

18. The method of claim 15, wherein at least one client/terminal computer further comprises a touch screen display device.

19. The method of claim 18, wherein at least one client/terminal computer further comprises a wager-acceptor device.

20. The method of claim 15, further comprising:

executing two or more computer gaming programs on the server/host computer; and separating input and output streams of the computer gaming programs executed on the server/host computer and redirecting the input and output streams to the client/terminal computers.

21. The method of claim 20, further comprising:

separating input an output streams of a first computer gaming program executed on one of the server/host computers and redirecting the input and output streams of the first computer gaming program to a first plurality of the client/terminal computers; and separating input and output streams of a second computer gaming program executed on one of the server/host computers and redirecting the input and output streams of the second computer gaming program to a second plurality of the client/terminal computers.

22. The method of claim 21, wherein the input and output streams of both the first and the second computer gaming programs are redirected to one of the client/terminal computers.

23. The method of claim 22, wherein the input and output streams of the first computer gaming program are redirected to a window displayed on a screen of the client/terminal computer and the input and output streams of the second computer gaming program are redirected to a sub-window of the window displayed on the screen of the client/terminal computer.

24. The method of claim 15, wherein the communication pathways comprise a local area network or a wide area network.

25. The method of claim 15, wherein the communication pathways comprise a global network.

26. The method of claim 25, wherein the client/terminal program is first downloaded from one of the server/host computers to one of the client/terminal computers over the global network.

27. The method of claim 26, further comprising:

a patron of one of the client/terminal computer requesting that the client/terminal program be downloaded from one of the server/host computers by accessing a web page.

28. A computer gaming system comprising:

a server/host computer executing an operating system program;

two or more display devices;

two or more input devices, each associated to one of the display devices for connecting to the server/host computer via communication pathways; and one or more computer gaming programs executed on the server/host computer;

wherein multiple gaming threads for at least one of the computer gaming programs are executed on the server/host computer and input and output streams associated with each gaming thread are directed to separate display and input devices.

29. The computer gaming system of claim 28, wherein the operating system program is a multi-threading operating system program.

* * * * *